(12) United States Patent
Owirka et al.

(10) Patent No.: US 10,054,680 B2
(45) Date of Patent: Aug. 21, 2018

(54) RADAR DETECTION OF ENDO-CLUTTER HIGH-VALUE TARGETS USING TRACKER FEEDBACK

(71) Applicant: BAE SYSTEMS Information & Electronic Systems Integration Inc., Nashua, NH (US)

(72) Inventors: Gregory J. Owirka, Tewksbury, MA (US); Douglas A. Page, Chestertown, NY (US); Thomas J. Kragh, Arlington, MA (US); Howard E. Nichols, Harvard, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 369 days.

(21) Appl. No.: 14/736,959

(22) Filed: Jun. 11, 2015

(65) Prior Publication Data
US 2016/0170019 A1    Jun. 16, 2016

Related U.S. Application Data

(60) Provisional application No. 62/022,437, filed on Jul. 9, 2014.

(51) Int. Cl.
*G01S 13/90* (2006.01)
*G01S 13/524* (2006.01)

(52) U.S. Cl.
CPC ...... *G01S 13/9029* (2013.01); *G01S 13/5242* (2013.01)

(58) Field of Classification Search
CPC .......................... G01S 13/5242; G01S 13/9029

USPC ........................................................ 342/25 B
See application file for complete search history.

(56) References Cited

U.S. PATENT DOCUMENTS

2010/0134346 A1*  6/2010  Reuillon ................. G01S 7/414
                                                             342/160

OTHER PUBLICATIONS

Frank C. Robey; Daniel R. Fuhrmann; Edward J. Kelly; Ramon Nitzberg, A CFAR Adaptive Matched Filter Detector, IEEE Transactions on Aerospace and Electronic Systems, vol. 28, No. 1, Jan. 1992.

Douglas Page; Gregory Owirka; Howard Nichols; Steven Scarborough, Circular SAR GMTI, SPIE Proceedings Jun. 2014 (Abstract).

(Continued)

*Primary Examiner* — Timothy A Brainard
(74) *Attorney, Agent, or Firm* — Maine Cernota & Kardin; Scott J. Asmus

(57) ABSTRACT

A radar signal target detection and display system employs feedback to produce improved detection and tracking. Portions of the radar images for each antenna channel to search for the target of interest are defined using the track state to define the center of the search region and using the track covariance matrix to define the size of the region. Moving reference processing (MRP) is performed. MRP employs a search centered on the motion state derived from the detection sent to the tracker on the previous coherent processing interval (CPI). Space-time adaptive processing (STAP) is employed on each CPI using a unique set of adaptive degrees of freedom (DOFs) derived from pre-MRP and post-MRP complex radar image amplitudes for each antenna channel.

18 Claims, 24 Drawing Sheets

(56) References Cited

OTHER PUBLICATIONS

J. Ward; Lincoln Lab.; MIT, Cramer-Rao bounds for target angle and doppler estimation with space-time adaptive processing radar, 1995 IEEE Xplore (Abstract).
Steven Scarborough, Detection and tracking of moving vehicles with Gotcha Radar Systems, IEEE AES Magazine, Jan. 2014.
Gregory E. Newstadt; Edmund Zelnio; Leroy Gorman; Alfred O. Hero III, Detection/Tracking of moving targets with synthetic aperture radars, SPIE 2010.
J. Ward, Space-Time Adaptive Processing for Airborne Radar, MIT/Lincoln Lab Technical Report 1015, Dec. 13, 1994.
Douglas Page; Gregory Owirka; Howard Nichols; Steven Scarborough; Michael Minardi; Leroy Gorham, Tracker-In-The-Loop GMTI Processing of Dismounts in MultiChannel SAR Data using Moving Reference Processing (MRP) SpaceTime Adaptive Processing (STAP), and Objective Level Change Detection (OLCD), 56 Annual Tri-Service Radar Symposium, Orlando, Florida, Jun. 21-25, 2010 (Abstract).

\* cited by examiner

RADAR DETECTION OF ENDO-CLUTTER HIGH-VALUE TARGETS USING TRACKER FEEDBACK

RELATED APPLICATIONS

This application claims the benefit of U.S. Provisional Application No. 62/022,437 filed Jul. 9, 2014. This application is herein incorporated by reference in its entirety for all purposes.

STATEMENT OF GOVERNMENT INTEREST

This invention was made with United States Government support under Contract No. FA8650-07-D-1227/0001 awarded by the U.S. Army. The United States Government has certain rights in this invention.

FIELD OF THE INVENTION

The invention relates to radar detection of targets, and more particularly, to high-value target tracking using multi-channel radar. Still more particularly, the invention relates to the tracking of highly maneuverable, low Radar Cross Section (RCS) targets such as civilian vehicles and dismounts, even in the presence of bright, heterogeneous clutter such as in a semi-urban environment in high traffic scenarios.

BACKGROUND OF THE INVENTION

Current radar systems are able to operate in several distinct modes, depending on the application. In Moving Target Indication (MTI) mode, typical radar systems focus a narrow beam over small regions in the field of view for small integration times on the order of milliseconds. However MTI-mode radars suffer from tradeoffs between the small integration time (that leads to low SNR values and coarse resolutions) as compared to the number of regions that can be observed. Furthermore, MTI systems can only detect velocities in a single direction, which allow for evasive maneuvers to avoid detection.

In synthetic aperture radar (SAR) mode, an image is constructed by integrating radar pulses from spatially diverse points in the platform's trajectory. This 'synthetic aperture' leads to 2-dimensional imaging as well as much finer resolutions than in MTI-mode, due to the ability to use longer integration times. However, these benefits do not come without cost. SAR was designed to image stationary scenes, consequently, moving targets cause phase errors in the reconstruction of a SAR image that lead to smearing and displacement of a target's energy signal.

Previous attempts to use SAR for moving target detection involved approaches entailing a high computational burden (due to the need for a great deal of image processing). Other attempts to improve the performance of SAR radar used for moving-target detection while minimizing the computational burden have resulted in detection performance decreasing when nearby targets are present, making them unsuitable for use in urban or semi-urban environments.

The 'Gotcha' radar concept employs a wide antenna beam, along with a high revisit rate and fine radar resolution to allow improved detection, tracking, and identification of ground targets. In an urban radar environment, clutter competing with moving target returns can be very strong, making it difficult to detect a target of interest, distinguish it from false alarms, and perform geolocation and tracking. Moreover, the targets of interest are expected to be maneuvering, which causes defocusing and reduction in amplitude of the target synthetic aperture radar (SAR) image signature. Urban environments are also likely to contain numerous moving targets producing SAR responses in the vicinity of targets being tracked, making mis-associations more likely.

An improved way to conduct high-value target tracking using multi-channel radar of highly-maneuverable, low-RCS targets (e.g., civilian vehicles and dismounts) even in the presence of bright, heterogeneous clutter (e.g., urban or semi-urban), or in high-traffic scenarios is needed.

SUMMARY OF THE INVENTION

An embodiment provides a system for radar detection of endo-clutter targets using tracker feedback, comprising selecting an endo-clutter target to be tracked; tracking the endo-clutter target using a synthetic aperture radar (SAR) having a plurality of antenna channels; for each of a plurality of coherent processing intervals (CPIs) employing polar-format SAR pre-processing in a processor of a radar receiver device of motion-compensated phase history data for each antenna channel; determining a location of a processed SAR image chip by converting track location and velocity into SAR image coordinates, wherein a size of the chip is proportional to a tracker error ellipse; compensating for defocusing due to target motion using an efficient one-dimensional moving reference processing (MRP) search over a single target defocus parameter expressed as a known function of the endo-clutter target and platform location, velocity, and acceleration; and performing space-time adaptive processing (STAP) on the SAR image chip using adaptive spatial antenna and temporal MRP degrees of freedom. In embodiments performing space-time excision and calculation of a likelihood metric to select a single detection to be used to update the tracker; and performing a polar formatting procedure to define a mapping from wavelength and slow-time to k-space. In other embodiments, the polar formatting procedure employed to define a mapping from wavelength and slow-time to k-space comprises a polar angle function and an optional wavenumber scale function. In subsequent embodiments, the polar angle used in the polar formatting procedure corresponds to an angle of a platform Line of Sight (LOS), projected into a slant plane, as seen at a radar aim-point. For additional embodiments, the polar angle function and the wavenumber scale function are prescribed functions of slow-time. In another embodiment, the wavenumber scale function is used to form images on planes other than a slant plane. A following embodiment further comprises employing SAR pre-processing of motion-compensated phase history data for each the antenna channel, wherein the motion-compensated phase history of a moving point scatterer is a function of a variable F, comprising a quadratic MRP defocus parameter, and is a function of locations, velocities, and accelerations of the endo-clutter target and radar platform. In subsequent embodiments implementation of the MRP compensates for defocus by applying a phase function in k-space whereby applying the phase function to a phase history function removes a quadratic defocus term from a target phase. In additional embodiments the coherent processing interval (CPI) is determined by expected target dynamics.

Another embodiment provides a method of radar detection of endo-clutter high-value targets using tracker feedback, comprising the steps of defining a portion of radar images for each of a plurality of antenna channels to search an endo-clutter target of interest; for each of a plurality of coherent processing intervals (CPIs) using a track state to define a center of a search region; using a track covariance matrix to define a size of the search region; performing an efficient form of moving reference processing (MRP), which employs a search centered on a motion state derived from a detection sent to a tracker on a previous CPI, to focus a target response and increase a signal to noise ratio (SNR); employing space-time adaptive processing (STAP) on each CPI using a unique set of adaptive degrees of freedom (DOFs) derived from pre-MRP and post-MRP complex radar image amplitudes for each antenna channel; employing a non-coherent change detection method to reduce false alarms when radar data from multiple orbits of a surveillance region is available; employing additional false alarm mitigation techniques; and employing adaptive parameter estimation to determine a geolocation solution for a detection sent to the tracker on each CPI. Included embodiments further comprise employing a range of about 10 dB to about 15 dB threshold for vehicles and a range of about 9 dB to about 12.5 dB threshold for dismounts. In yet further embodiments, the threshold for vehicles is about 10 dB and the threshold for dismounts is about 9 dB. Related embodiments further comprise performing a 2D peaking operation, the 2D peaking operation requiring that a detection be a simultaneous peak over cross-range and MRP motion state, thereby significantly reducing effects of MRP sidelobes and thus reducing the number of pixels that need to be considered. For further embodiments, correction for target contamination is performed using a two-pass procedure and a straight line fit to a measured phase shift index for false alarm mitigation and geolocation. In ensuing embodiments a likelihood metric is calculated using a 4-dimensional track grid centered on a current mean track state. Other embodiments further comprise a Multiple Hypothesis tracker (MHT) which uses a road network to improve track accuracy. In continued embodiments non-coherent change detection (NCCD) is performed to further reduce false alarms. Additional embodiments further comprise automatically switching between conventional and STAP modes as a target transitions between stopped and moving states, using automation logic, a track state, and report history. For yet further embodiments, normal STAP-mode processing employs a radial velocity threshold of about 0.5 m/s.

A yet further embodiment provides a method for radar detection, geolocating and tracking moving endo-clutter targets in multi-channel synthetic aperture radar (SAR) data using tracker feedback, comprising the steps of receiving, at a radar receiver device, a set of radar pulses from each of a plurality of antenna channels, the pulses being motion compensated and polar-format processed into a radar image; defining a portion of the radar image for each antenna channel to search for a target of interest, wherein a track state is used to define a center of a search region, and a track covariance matrix is used to define a size of the search region; performing an efficient form of moving reference processing (MRP) to focus a target response and increase a signal to noise ratio (SNR), wherein the MRP employs a search centered on a motion state derived from a detection sent to a tracker on a previous coherent processing interval (CPI); employing space-time adaptive processing (STAP) on each CPI using a unique set of adaptive degrees of freedom (DOFs) derived from pre-MRP and post-MRP complex radar image amplitudes for each antenna channel; employing a non-coherent change detection method to reduce false alarms when radar data from multiple orbits of a surveillance region is available; employing additional false alarm mitigation techniques, the additional false alarm techniques comprising space-time excision and calculation of a likelihood metric to select a single detection used to update the tracker; employing adaptive parameter estimation to determine a geolocation solution for a detection sent to the tracker on each CPI; employing automated mode switching to determine when to switch between employing conventional beam-forming in place of STAP to handle situations in which a target or targets slow to a stop; and for each CPI, annotating a geo-located target position on a display, the display including a geo-referenced radar image, and/or other map image layers.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
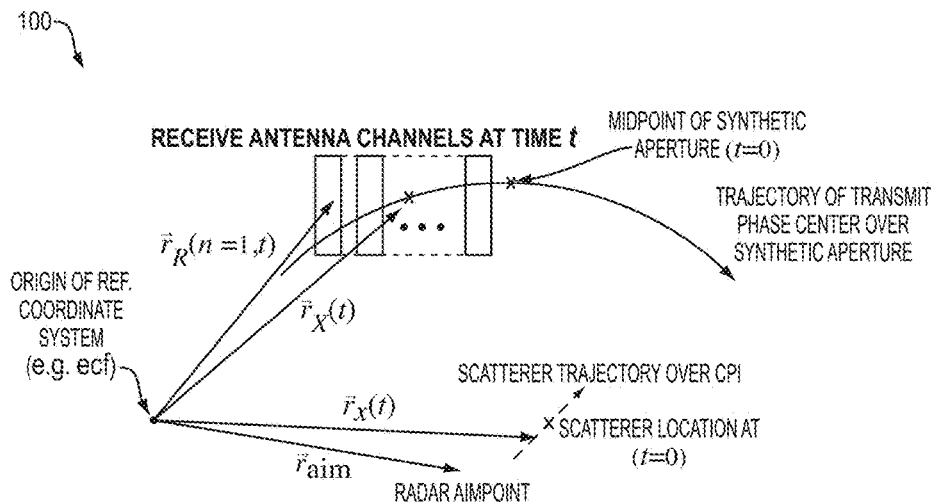
FIG. 1 illustrates the collection geometry for a multichannel spotlight SAR scenario, including definitions of quantities appearing in the scatterer model configured in accordance with one embodiment of the invention.

The present invention is an "in-the-loop" method for detecting, geolocating, and tracking in main-beam clutter (i.e. endo-clutter, not noise-only exo-clutter) targets in multi-channel Synthetic Aperture Radar (SAR) data. The approach employs tracker feedback in the detection processing in order to maximize tracking performance on a single target, which is assumed to be identified at some initial time. To compensate for platform-induced range and Doppler dispersion, embodiments employ SAR pre-processing of motion-compensated phase history data for each antenna channel. The location of the processed SAR image chip on each coherent processing interval (CPI) is determined by converting track location and velocity into SAR image coordinates. The size of the small extracted sub-image (chip) is a function of the tracker error ellipse, allowing for smaller image chips when the target motion state is known accurately. Embodiments compensate for defocusing due to target motion using an efficient one-dimensional Moving Reference Processing (MRP) search over a single target defocus parameter (which is expressed as a known function of target and platform location, velocity, and acceleration). In order to cancel clutter, embodiments perform Space-Time Adaptive Processing (STAP) using adaptive spatial antenna and temporal MRP degrees of freedom. Additional steps are also defined in order to mitigate false alarms, obtain parameter estimates, and determine geolocated detection reports on each CPI.

Embodiments of the present disclosure employ feedback from the High Value Target (HVT) track to produce improved detection and tracking. The general method of such embodiments comprises:
 a) Defining the portion of the radar images for each antenna channel to search for the target of interest, using the track state to define the center of the search region and using the track covariance matrix to define the size of the region;
 b) Performing an efficient form of moving reference processing (MRP) to focus the target response and increase the signal to noise ratio (SNR), where MRP employs a search centered on the motion state derived from the detection sent to the tracker on the previous coherent processing interval (CPI);
 c) Employing space-time adaptive processing (STAP) on each CPI using a unique set of adaptive degrees of freedom (DOFs) derived from pre-MRP and post-MRP complex radar image amplitudes for each antenna channel;
 d) Employing a non-coherent change detection method to reduce false alarms when radar data from multiple orbits of the surveillance region is available;
 e) Employing additional false alarm techniques, including space-time excision and calculation of a likelihood metric to select a single detection used to update the tracker; and
 f) Employing adaptive parameter estimation to determine a geolocation solution for the detection sent to the tracker on each CPI.
 g) Employing conventional beam-forming in place of STAP to handle situations in which a target or targets slow to a stop (and are therefore not detectable by STAP); these embodiments may also employ automated mode switching to determine when to switch between STAP and conventional processing.

Embodiments describe an approach employing tracker feedback and a multi-channel Gotcha radar system to address the challenges described above and provide improved detection, geolocation, and tracking of a single target of interest. The location and velocity of the target to be tracked are assumed to be known at some initial time (in an operational system these might be verified initially, for example, using video).

On each coherent processing interval (CPI), polar-format SAR pre-processing is performed on each antenna channel in order to focus up stationary clutter scatterers, which reduces their frequency dispersion. A SAR chip for each antenna channel is then cut using the predicted track state and covariance matrix to determine the center location and size of the chip. Tailoring the processed SAR chip to only the area around the predicted track minimizes the opportunities for false alarms and mis-associations. This in turn allows reduced detection thresholds to be employed in order to maximize the probability of detecting the target of interest. In order to produce improved target focus as well as enhanced separation of target from clutter, an efficient form of moving reference processing (MRP) is implemented. In order to account for a changing target motion state, a one-dimensional search over a target motion parameter is employed. Section 1 describes the scatterer model and MRP implementation embodiments used on the SAR pre-processed data to compensate for moving target defocus and focus up movers.

Enhancement of moving targets relative to clutter as a precursor to target detection is next accomplished using space-time adaptive processing (STAP), as is described in J.

Ward, "Space-Time Adaptive Processing for Airborne Radar", Tech. Rep. F19628-95-C-0002, MIT Lincoln Laboratory, December 1994, the contents of which are incorporated herein by reference. Section 2 describes the adaptive MRP STAP method embodiments used by embodiments of the present disclosure to raise the targets above the clutter and perform adaptive parameter estimation. A number of additional steps that may be used to eliminate false alarms and reduce mis-associations with other targets, as well as perform geolocation are also described. Examples containing vehicles in the Gotcha 2006 Data Collection are given in Section 2 hereafter.

Section 3 describes refinements made to this approach for dismounts, and presents the results of processing dismounts in the Gotcha 2006 Data Collection. Examples of individual CPIs from the Gotcha 2006 Data Collection containing dismounts are presented that demonstrate how many of the defined steps in the Ground Moving Target Indicator (GMTI) processing are beneficial for detecting and tracking dismount targets. Finally, dismount track performance (time in track) is presented for three different algorithm configurations. The results show that the adaptive MRP approach produces significant benefits to track performance, even though the MRP model employed in embodiments is based on a constant acceleration assumption. The latter is not expected to be as good a model for dismounts as for vehicles; nevertheless, the adaptive MRP implementation produces significant improvement in track performance over either a STAP/non-adaptive MRP implementation or a STAP/no MRP implementation.

Section 1: The Scatterer Model and Formulation of Efficient MRP

FIG. 1 defines the different vector quantities 100 appearing in the scattering model used for the SAR MRP formulation.

The motion-compensated phase history of a moving point scatterer is assumed to be given by:

$$P(\lambda, t) = A \cdot \exp\left[-j \cdot \frac{4\pi}{\lambda} \cdot \{|\vec{r}_{AC}(t) - \vec{r}_{sc}(t)| - |\vec{r}_{AC}(t) - \vec{r}_{aim}|\}\right] \quad \text{EQ. (1)}$$

$\lambda$=radar wavelength, t=slow-time

The polar formatting procedure employed defines a mapping from wavelength and slow-time to k-space as follows:

$$k_y(\lambda, t) = \frac{1}{s(t)} \cdot \frac{4\pi}{\lambda} \cos\theta(t),$$

$$k_x(\lambda, t) = \frac{1}{s(t)} \cdot \frac{4\pi}{\lambda} \sin\theta(t)$$

$$k(\lambda) \equiv \sqrt{k_x(\lambda, t)^2 + k_y(\lambda, t)^2}$$

$$\text{EQ. (2)}$$

Figure 2:
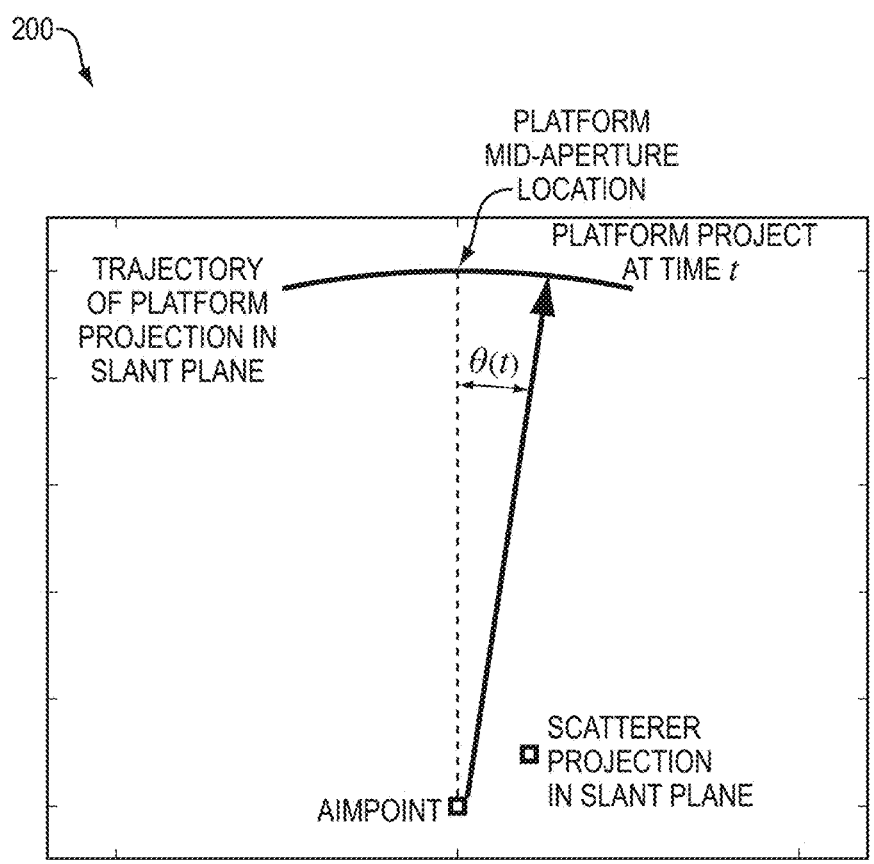
FIG. 2 is a schematic drawing showing an illustration of definition of a polar angle used in polar formatting configured in accordance with one embodiment of the invention.

Here, the polar angle $\theta(t)$ and the wavenumber scale function $s(t)$ are prescribed functions of slow-time. The polar angle corresponds to the angle of the platform Line of Sight (LOS), projected into the slant plane, as seen at the radar aimpoint (as is shown in FIG. 2).

The wavenumber scale function $s(t)$ appearing in Eq. (2) is an optional factor that can be used to compensate for out of plane motion of the platform, or to form images on planes other than the slant plane. For the results shown here, the values of the wavenumber scale function used for all the images processed were very close to 1. If the phase in Eq. (1) is expanded as a second order Taylor series in slow-time, and the definition (2) is used, it can be shown that $$P(\lambda,t) \approx \exp\{j \cdot [k_y(\lambda,t) \cdot y_{im} + k_x(\lambda,t) \cdot x_{im} - k(\lambda) \cdot F \cdot \theta(t)^2]\} \quad \text{EQ. (3)}$$

Here, $x_{im}$ and $y_{im}$ represent the observed x and y locations in the SAR image respectively, and are known functions of the target and platform location and velocity parameters. The variable F is the quadratic MRP defocus parameter, and is a function of the locations, velocities, and accelerations of the target and radar platform.

The third term in the phase in Eq. (3), proportional to F, causes a defocusing of the SAR image response of a moving target. Given a value of F, the implementation of MRP compensates for this defocus by applying the following phase function in k-space:

$$g(\lambda,t) = \exp\{j \cdot k(\lambda) \cdot F \cdot \theta(t)^2\}$$

Invert polar format transform $\lambda, t \to k_x, k_y \Rightarrow G(k_x, k_y)$ \quad EQ. (4)

Note that, neglecting polar format interpolation errors and assuming embodiments are using the correct value of F, applying the phase function in (4) to the phase history function in Eq. (3) removes the quadratic defocus term from the phase. This in turn focuses up the moving target response and increases the peak amplitude to noise ratio, thus providing improved detection.

The equations defining the SAR location coordinates $x_{im}, y_{im}$ in terms of the quantities defined above are:

$$y_{im} = s \cdot \{R_a - |\vec{r}_{AC} - \vec{r}_{sc}|\}$$

$R_a \equiv |\vec{r}_{AC} - \vec{r}_{aim}|$=distance from aimpoint to platform at mid-aperture $$x_{im} = \frac{y_{im} \cdot \dot{s}}{\omega \cdot s} - \frac{s}{\omega}(\vec{v}_{AC} - \vec{v}_{sc}) \cdot \frac{\vec{r}_{AC} \cdot \vec{r}_{sc}}{|\vec{r}_{AC} \cdot \vec{r}_{sc}|} + \frac{s}{\omega}\vec{v}_{AC} \cdot \frac{\vec{r}_{AC} - \vec{r}_{aim}}{R_a}$$

$\omega = \dot{\theta}(0)$=angular velocity of polar angle in slant plane at mid-aperture \quad EQ. (5)

For notational convenience, the "(0)" is dropped from all the vector quantities and the wavenumber scale function (mid-aperture values assumed). The first part of Eq. (5) shows that $y_{im}$ is proportional to the negative of the differential slant range of the scatterer to the radar platform, relative to the radar aimpoint (i.e. the distance of the aimpoint from the platform at mid-aperture, minus the distance of the scatterer to the platform at mid-aperture). The second half of Eq. (5) contains terms due to the "true" cross-range of the target (the terms proportional to $\vec{v}_{AC}$), as well as a term due to the Doppler shift due to target motion (proportional to $\vec{v}_{sc} \cdot (\vec{r}_{AC} - \vec{r}_{sc})/|\vec{r}_{AC} - \vec{r}_{sc}|$).

The equation defining the MRP defocus parameter F as a function of the definitions above is:

$$F = -\frac{y_{im}}{2} - \left[\frac{\ddot{s}}{2\omega^2} - \frac{\alpha \dot{s}}{2\omega^3}\right] \cdot \frac{y_{im}}{s} + \quad \text{EQ. (6)}$$

$$\frac{s}{2\omega^2} \cdot \left\{\frac{[\vec{a}_{AC} - \vec{a}_{sc}] \cdot [\vec{r}_{AC} - \vec{r}_{sc}] + |\vec{v}_{AC} - \vec{v}_{sc}|^2}{R_{AC,sc}} - \right.$$

$$\left.\frac{\{[\vec{v}_{AC} - \vec{v}_{sc}] \cdot [\vec{r}_{AC} - \vec{r}_{sc}]\}^2}{R_{AC,sc}^3} - \right.$$

-continued $$\frac{\vec{a}_{AC} \cdot [\vec{r}_{AC} - \vec{r}_{aim}] + |\vec{v}_{AC}|^2}{R_a} + \frac{[\vec{v}_{AC} \cdot [\vec{r}_{AC} - \vec{r}_{aim}]]^2}{R_a^3} \Bigg\} +$$

$$\left[\frac{\dot{s}}{\omega^2} - \frac{\alpha \cdot s}{2\omega^3}\right] \cdot \left\{ [\vec{v}_{AC} - \vec{v}_{sc}] \cdot \frac{[\vec{r}_{AC} - \vec{r}_{sc}]}{R_{AC,sc}} - \vec{v}_{AC} \cdot \frac{[\vec{r}_{AC} - \vec{r}_{aim}]}{R_a} \right\}$$

$\alpha \equiv \ddot{\theta}(0)$=angular acceleration of polar angle in slant plane at mid-aperture For the special case of a non-squinted geometry, no platform angular acceleration, a wavenumber scale function equal to unity, and a scatterer with zero acceleration located at the aimpoint, Eqs. (5) and (6) reduce to:

$$y_{im} = 0, \quad \text{EQ. (7)}$$

$$x_{im} = \frac{(\vec{v}_{sc})_y}{\omega},$$

$$F = -\frac{(\vec{a}_{sc})_y}{2\omega^2} - \frac{(v_{sc})_x}{\omega} + \frac{|\vec{v}_{sc}|^2 - (\vec{v}_{sc})_y^2}{2\omega^2 R_a}$$

Here, we have defined the "y" direction as pointing along the line of sight from the radar aimpoint to the platform at mid-aperture, and the "x" direction is defined along the platform velocity vector (which is perpendicular to the y direction due to the non-squinted geometry assumption):

$$\hat{e}_y \equiv \frac{\vec{r}_{AC} - \vec{r}_{aim}}{R_a}, \quad \text{EQs. (8)}$$

$$\vec{v}_y \equiv \vec{v} \cdot \hat{e}_y,$$

$$\hat{e}_x \equiv \frac{\vec{v}_{AC}}{|\vec{v}_{AC}| = \omega R_a},$$

$$\vec{v}_x \equiv \vec{v} \cdot \hat{e}_x$$

The second equation in (7) shows the displacement in cross-range due to target Doppler. The third equation in (7) shows that to first order the quadratic defocus parameter is a linear combination of "radial acceleration" $(\vec{a}_{sc})_y$ and "cross-range velocity" $(v_{sc})_x$. Eqs. (5) and (6) have been verified with numerous simulated examples as well as with measured data using GPS truth information.

FIG. 2 is a schematic drawing 200 showing an illustration of definition of polar angle used in polar formatting.

Figure 3:
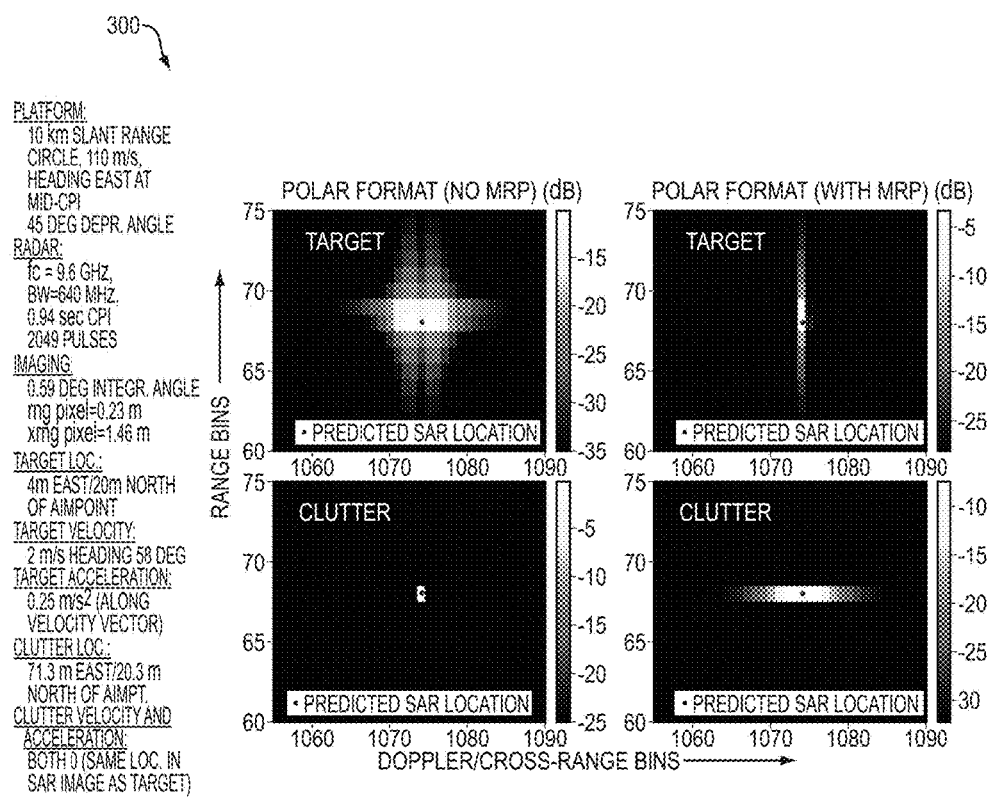
FIG. 3 is an illustration of a simulated Moving Reference Processing (MRP) example showing a slow accelerating mover with single stationary clutter scatterer configured in accordance with one embodiment of the invention.

FIG. 3 shows the simulated SAR responses before and after MRP for two different scatterers 300: a slowly moving but accelerating point target and a stationary point clutter scatterer. The platform geometry and radar parameters have been selected to closely correspond to the Gotcha 2006 Data Collection, and CPI lengths used in the evaluations. Note that, before MRP is applied, the moving target is defocused, while the clutter scatterer is focused. After MRP is applied using Eq. (6) to determine the F parameter, the target is focused up to a single pixel and the clutter is defocused. The predicted locations of the responses determined from Eq. (5) are also indicated in FIG. 3, and are in agreement with the observed locations of the responses.

Figure 4:
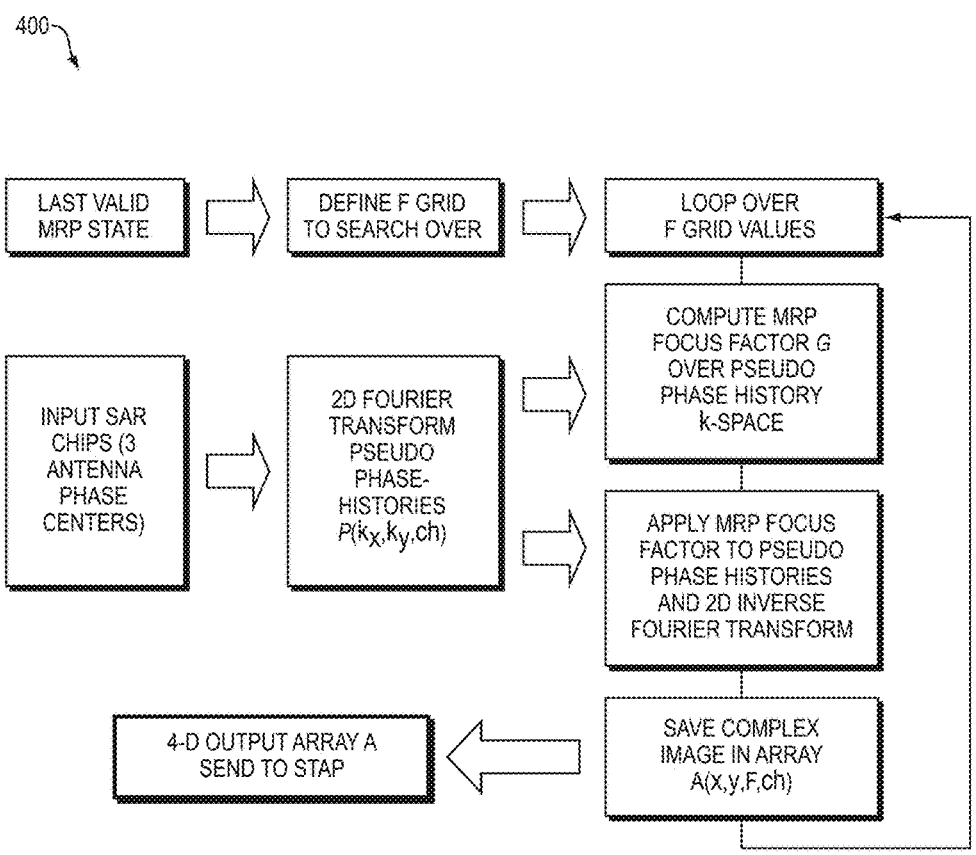
FIG. 4 is a schematic block diagram for "F-grid" implementation of MRP configured in accordance with one embodiment of the invention.

FIG. 4 shows a block diagram 400 of one-dimensional "F-grid" implementation of MRP, as used in various embodiments. In such embodiments, the one-dimensional search grid is centered on the value of F used for the report sent to the tracker on the previous CPI. A loop over the search grid is entered, and MRP is applied to the SAR chip pseudo phase-histories (obtained through 2D Fourier transformation) for each of the antenna channels using the phase function shown in Eq. (4).

After applying the MRP phase function to the pseudo-phase histories, an inverse Fourier transform is applied to get back to the image domain. The resulting complex chips for each processed F parameter (including F=0 corresponding to no MRP) are stored in a 4-dimensional array which is sent to the STAP part of the processing.

Section 2: STAP Filtering, Detection, and Parameter Estimation

In order to perform STAP, in embodiments a set of adaptive degrees of freedom (DOFs) must be selected. FIG. 3 shows how the responses of a moving target and a clutter scatterer change when MRP is performed. Basically, a moving target will increase in amplitude and focus up, while a stationary clutter scatterer will go down in amplitude and defocus when MRP is applied with an F parameter corresponding to the location, velocity, and acceleration of the moving target. Below will be described a set of adaptive degrees of freedom (DOFs) that exploit the observed behavior in order to provide enhancement of the target to clutter ratio after STAP.

Figure 5:
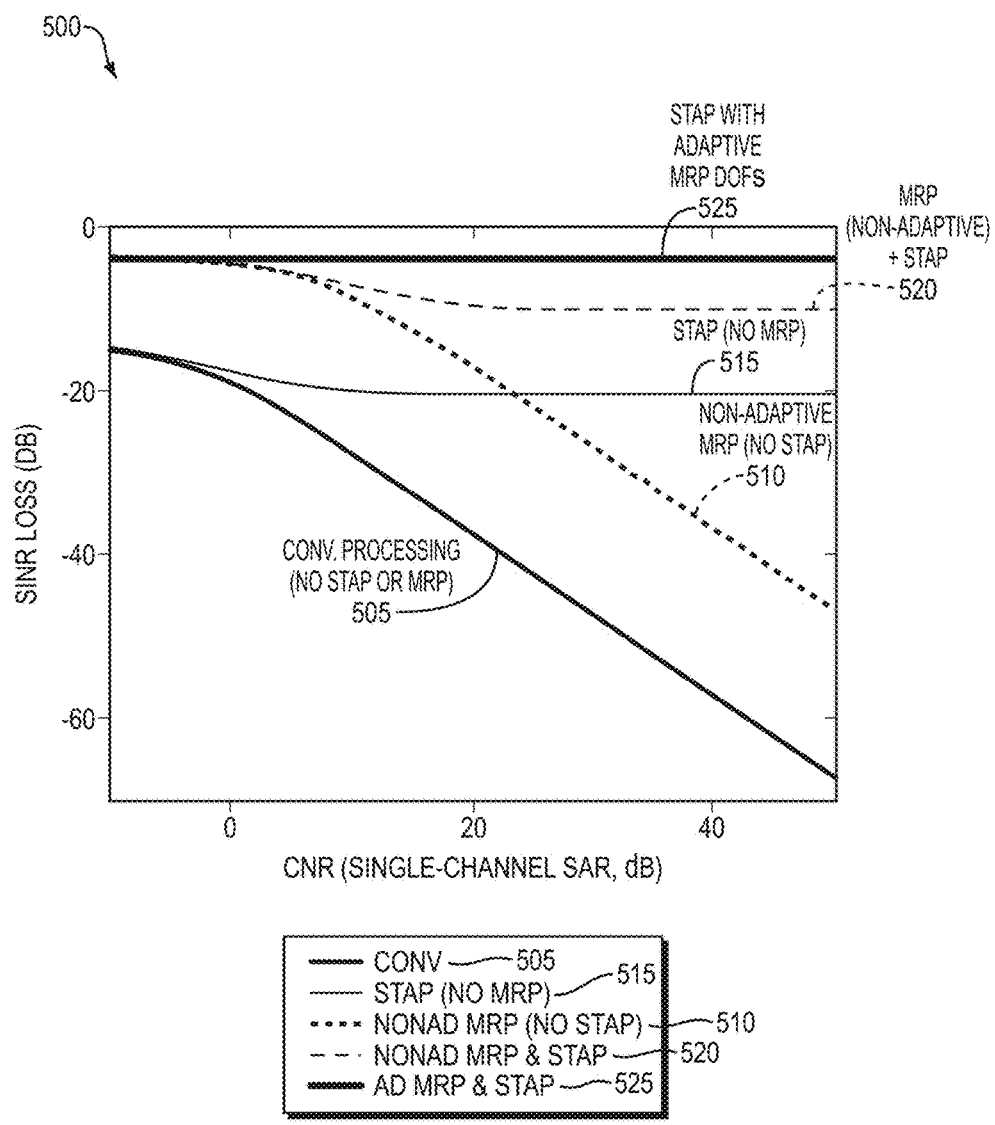
FIG. 5 is a graph showing Signal to Interference plus Noise Ratio (SINR) Loss vs. Clutter to Noise Ratio (CNR) for a simulated constant acceleration MRP example configured in accordance with one embodiment of the invention.

FIG. 5 shows the effect 500 of employing different adaptive DOFs on the output signal to interference ratio (SINR) after STAP for the simulated example shown in FIG. 3, as a function of the clutter to noise ratio (CNR) of the clutter scatterer. For reference, the SINR curves for non-adaptive processing across the three antenna channels before ("Cony.", curve 505) and after ("Non-adaptive MRP", curve 510) MRP are also shown. Curve 515 ("STAP (no MRP)") corresponds to employing post-Doppler STAP using antenna spatial (only) DOFs before MRP (3 adaptive DOFs for the example processed). Curve 520 corresponds to employing the same spatial-only DOFs after performing (non-adaptive) MRP. Finally, the curve 525 corresponds to using post-Doppler STAP with spatial antenna DOFs and temporal MRP DOFs. The latter are defined in a manner that will be described below. Curve 525 clearly provides the best SINR in this simulated example. While this example may be a simplified case, it does contain the essential elements of the real situation, and embodiments have also observed improved performance on actual CPIs from the Gotcha 2006 Data Collection set using this adaptive MRP set of DOFs.

Figure 6:
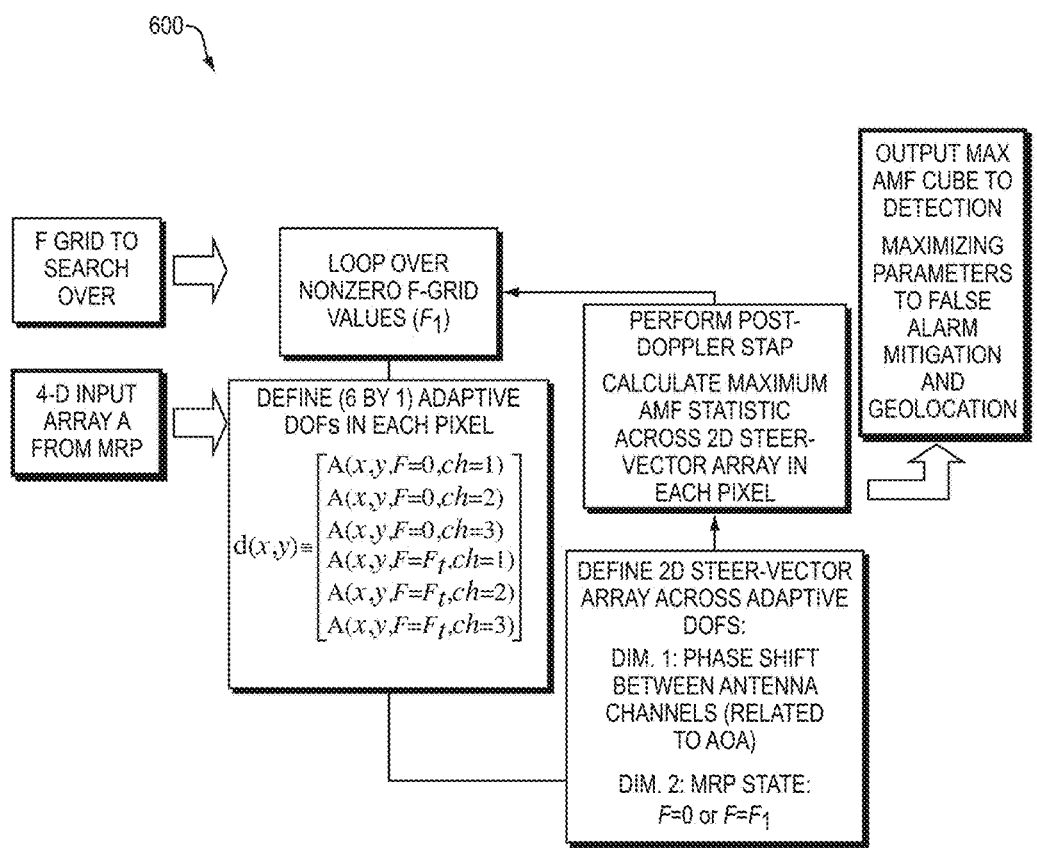
FIG. 6 is a schematic block diagram of "adaptive MRP" Space Time Adaptive Processing (STAP) Adaptive Matched Filter (AMF) calculation configured in accordance with one embodiment of the invention.

FIG. 6 shows a block diagram 600 of the "adaptive MRP" STAP configuration embodiments employ. A loop over the one-dimensional MRP F parameter is again entered, and complex pixel amplitudes for the SAR chips from each antenna channel are extracted from the 4-dimensional array obtained from the output of MRP (as shown in FIG. 4). For each pixel, the complex amplitudes corresponding to F=0 (i.e. SAR without MRP) and F=$F_1$ (SAR with MRP using the current F parameter in the loop) are stacked to yield a 6-dimensional data vector. Calculation of the adaptive matched filter statistic (AMF) is next performed using an estimated covariance matrix in each cross-range (pseudo-Doppler) column, and a two-dimensional array of target steering vectors. In order to reduce target contamination of the covariance estimates, embodiments exclude the test cell. The AMF statistic is then used for both detection and parameter estimation, as described in Frank C. Robey, Daniel R. Fuhrmann, Edward J. Kelly, Ramon Nitzberg, "A CFAR Adaptive Matched Filter Detector", IEEE Transactions on Aerospace and Electronic Systems, Vol. 28, pp. 208-216, (1992) and James Ward, "Angle and Doppler Estimation with STAP Radar", 4th Annual Adaptive Sensor Array Processing (ASAP) Workshop, 14 Mar. 1996 James Ward, "Cramer-Rao bounds for target angle and Doppler estimation with space-time adaptive processing radar", Signals, Systems and Computers, 1995, 1995 Conference Record of the Twenty-Ninth Asilomar Conference, pp. 1198-1202 Vol. 2, the contents of which are incorporated herein by reference. The two parameters being estimated are Angle of Arrival (AOA) (first dimension of steer vector array) and MRP motion state (second dimension of steer vector array). Maximization of the AMF over these two parameters provides maximum likelihood estimates, and detection is performed by thresholding the AMF, which acts as an embedded Constant False Alarm Rate (CFAR) detector. Detailed equations for the STAP AMF calculations are in the references.

Figure 7:
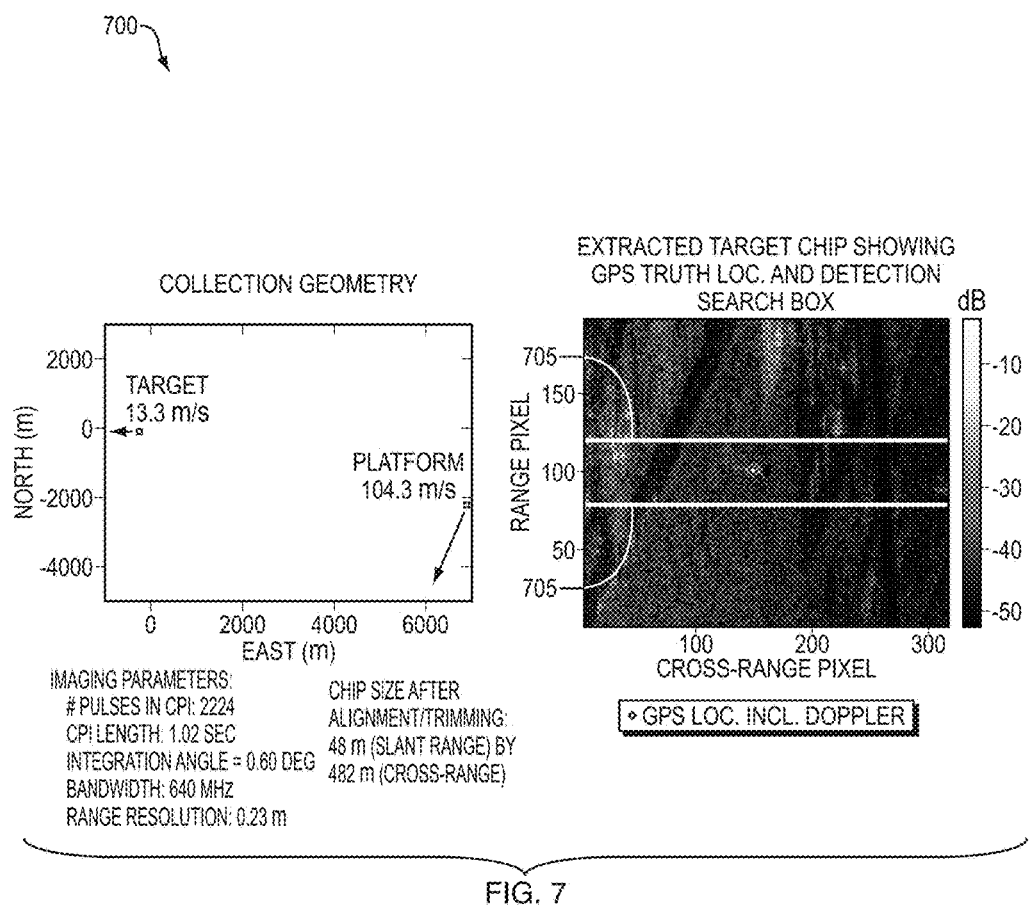
FIG. 7 is an extracted SAR chip and imaging geometry for an "easy" Coherent Processing Interval (CPI) containing a vehicle visible in SAR image configured in accordance with one embodiment of the invention.

FIG. 7 shows the imaging geometry, CPI parameters, and single channel SAR target chip 700 for an example containing a vehicle visible in the SAR image (i.e. an "easy" example). The (Doppler-shifted) truth location is also shown on the chip, and the horizontal lines 705 on the right half of FIG. 7 show the detection search box (i.e. the area over which detection processing is performed). The actual chip extracted is larger than the detection search box in order to give more training data for both image registration (to the reference orbit) and covariance estimation (for STAP). The center of the chip is defined by the location and velocity of the mean track state, which is converted to SAR coordinates using Eq. (5). The size of the detection search box is a function of the track covariance matrix (edges of initial box are three standard deviations away from the center along the principal axes of the track covariance), which is enlarged to allow for fixed systematic errors, possible radial acceleration, and expected cross-range defocus.

Figure 8:
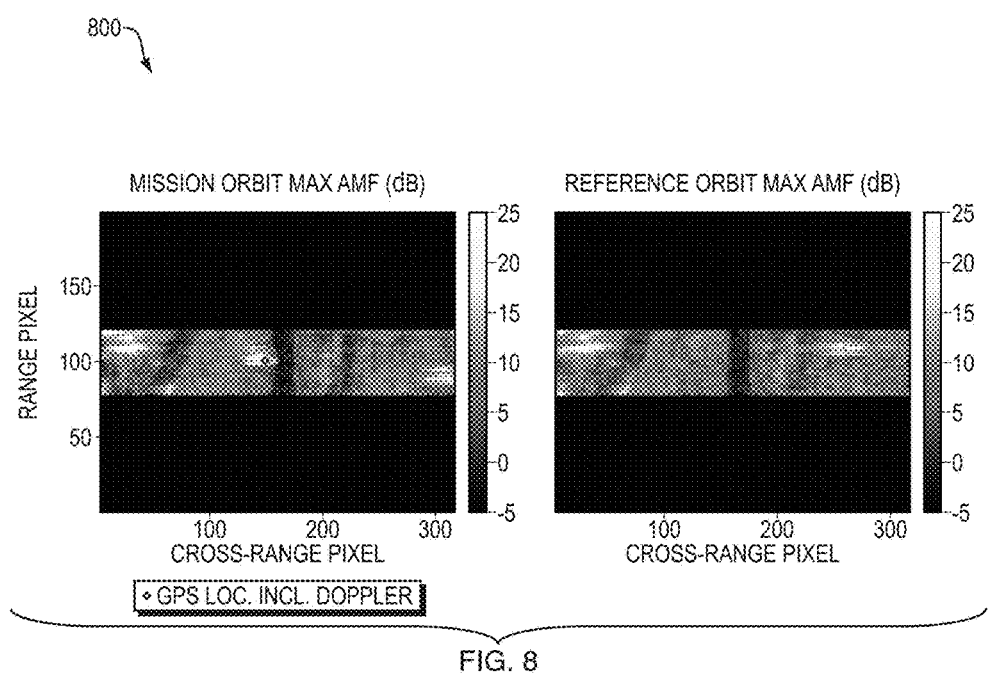
FIG. 8 is a STAP maximum AMF image for mission and reference orbits for the example as shown in the previous figure, FIG. 7, configured in accordance with one embodiment of the invention.

FIG. 8 shows the maximum AMF images 800 over the detection search box for both mission and reference orbits. The target of interest is expected to appear near the indicated GPS truth location in the mission AMF image, but not the reference (note: the truth is not used in any of the processing, only for evaluation purposes). Note that FIG. 8 shows AMF images that are maximized over the two steering vector parameters (i.e. AOA index and MRP motion state) in each pixel. Due to the effect of MRP on clutter (as is shown in FIG. 3), it is expected that any residual clutter will be defocused. Additionally, as searching is over a grid of defocus parameters, the target AMF response is expected to be defocused, due to MRP cross-range sidelobes. To extract detections from the maximum AMF images, embodiments first perform a thresholding of the mission orbit AMF image. The set of potential target detections are next reduced by applying, on a pixel-by-pixel level, a maximum threshold to the reference orbit AMF image. This procedure is referred to as Object Level Change Detection (OLCD), even though the pixel-by-pixel operation that embodiments perform may not coincide with the usual definition of OLCD. A 2D peaking operation is then applied, which requires that a detection be a simultaneous peak over cross-range and MRP motion state. This operation significantly reduces the effects of MRP sidelobes and thus reduces the number of pixels that need to be considered (which might at first glance appear to be large from FIG. 8).

Figure 9:
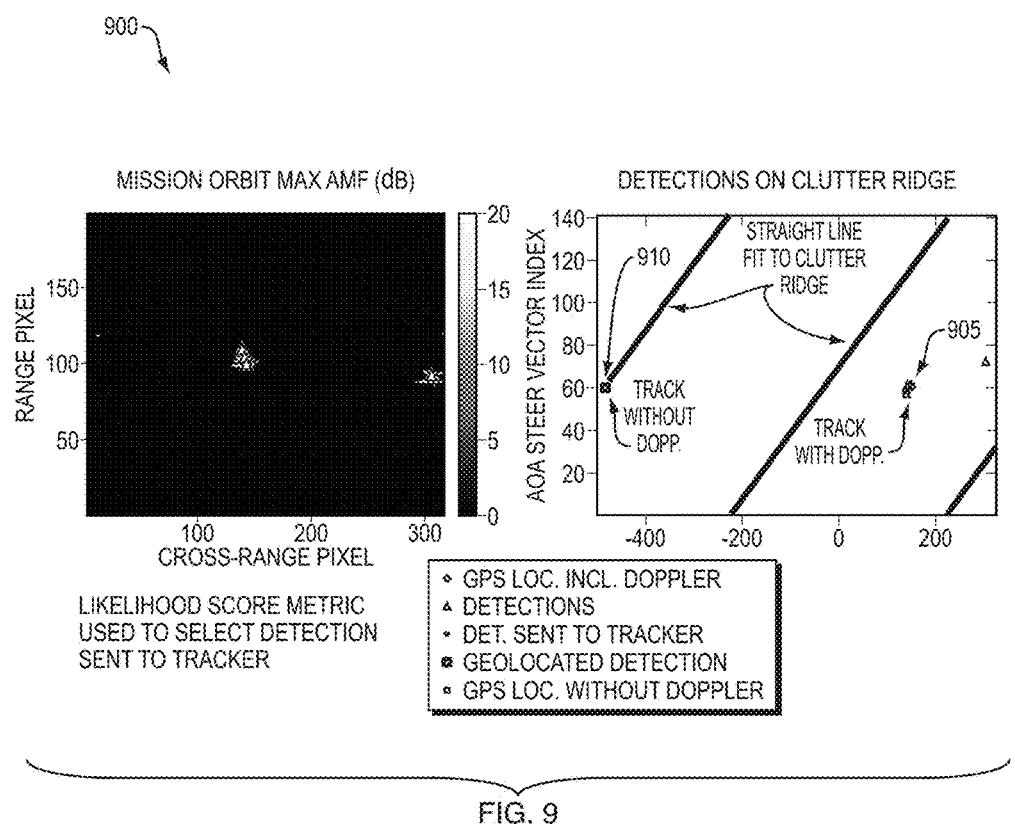
FIG. 9 is a STAP AMF image after Object Level Change Detection (OLCD) and thresholding (15 dB AMF) and detections after 2D peaking configured in accordance with one embodiment of the invention.

FIG. 9 shows the mission orbit STAP AMF image 900 after thresholding and OLCD, along with the set of detections remaining after 2D peaking. The right half of FIG. 9 shows the AOA index of the detections as a function of cross-range along with the measured clutter ridge. The clutter ridge is measured by obtaining maximum likelihood estimates of channel-to-channel phase shift as a function of cross-range pixel using a scatterer in noise model and the spatial 3 by 3 part of the covariance estimates. Correction for target contamination is performed using a two-pass procedure, and a straight line fit to the measured phase shift index versus cross-range yields the clutter ridge used for false alarm mitigation and geolocation. Note that due to the fact that the spacing of the antenna channels is many wavelengths, ambiguities or multiple branches of the clutter ridge occur.

The first step in geolocating a given detection is to determine the cross-range pixel for which the clutter ridge AOA index matches the estimated AOA index of the detection. More simply, a horizontal line is drawn from the detection to determine where it intersects the clutter ridge. The ambiguity in the clutter ridge is resolved by using the branch containing the location of the non-Doppler shifted track location to determine the "true" cross-range pixel of the detection. A Digital Terrain and Elevation Data (DTED) data-base is then used to refine the geolocation solution using an actual height model. One additional false alarm mitigation step that was implemented in embodiments, referred to as "space-time excision", involves removing from consideration any detections that are "too close" to the clutter ridge (and therefore likely to be clutter false alarms rather than moving target detections). The threshold employed is important and depends on the "mode" in which embodiments are operating (which will be discussed further below), in normal STAP-mode processing embodiments employ a radial velocity threshold of 0.5 m/s (converted to cross-range pixels) for superior performance.

Even after applying the steps described above to reduce the set of possible target detections, there may still be detections from multiple scatterers in the processed search area. FIG. 9 shows detections occurring in two well separated portions, likely coming from two different targets. In order to further decrease the chances of mis-association, embodiments calculate a likelihood metric for each remaining detection using a numerical approximation to the following probability density function:

$$p(d) = \int d^2 r \int d^2 v \cdot \rho_{meas}(d \mid r \cdot v) \cdot \rho_{track}(r, v), \quad \text{EQ. (10)}$$

$r \equiv 3D$ position vector of scatterer (lying on DTED)

$v \equiv 3D$ velocity vector of scatterer (corrected for terrain slope)

$$\rho_{meas}(d \mid r, v) \equiv \frac{1}{\sqrt{2\pi}\, \sigma_{x_{im}^{(meas)}(d)}} \exp\left\{-\frac{[x_{im}^{(meas)}(d) - x_{im}(r, v)]^2}{2\sigma_{x_{im}^{(meas)}(d)}^2}\right\} \cdot \frac{1}{\sqrt{2\pi}\, \sigma_{y_{im}^{(meas)}(d)}} \exp\left\{-\frac{[y_{im}^{(meas)}(d) - y_{im}(r, v)]^2}{2\sigma_{y_{im}^{(meas)}(d)}^2}\right\} \cdot \frac{1}{\sqrt{2\pi}\, \sigma_{x_{AOA}^{(meas)}(d)}} \exp\left\{-\frac{[x_{AOA}^{(meas)}(d) - x_{im}(r, 0)]^2}{2\sigma_{x_{AOA}^{(meas)}(d)}^2}\right\}$$

$\rho_{track}(r, v) \equiv$ track prior distribution (assumed Gaussian determined by mean track state and covariance)

Eq. (10) contains a multi-variate Gaussian track prior distribution $\rho_{track}(r,v)$, and independent Gaussian distributions of the measured cross-range with Doppler shift $x_{im}^{(meas)}(d)$, measured range $y_{im}^{(meas)}(d)$, and measured "true" cross-range after AOA estimation $x_{AOA}^{(meas)}(d)$. The distributions of these three measured variables are each conditioned on the track state r,v. In order to numerically approximate the integral in Eq. (10), a 4-dimensional "track grid" centered on the current mean track state is defined, and Eq. (5) is used to define the means of the Gaussian distributions of the three measured variables for each point on the track grid. Diamond 905 in FIG. 9 shows the detection having the highest value of the likelihood score. Square 910 shows the corresponding "true" location after AOA estimation. The detection selected using this logic is usually (but not always) close to the center of the processed SAR chip.

Figure 10:
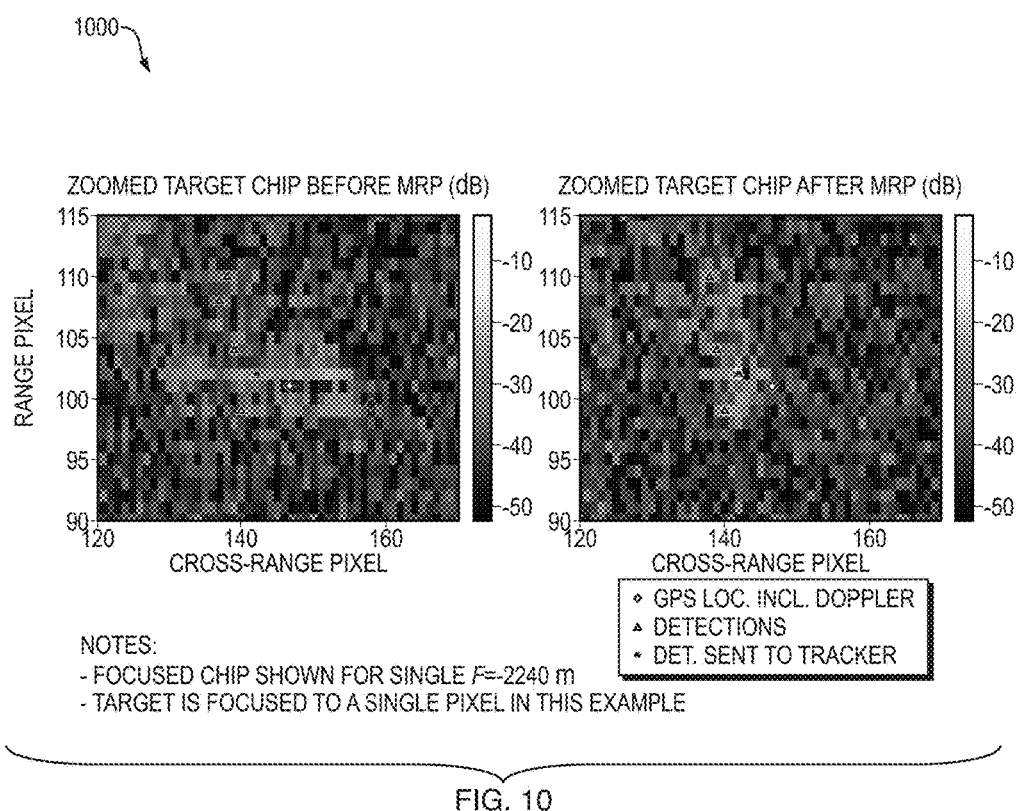
FIG. 10 is a zoomed portion of an image chip containing a target before and after MRP configured in accordance with one embodiment of the invention.
Figure 11:
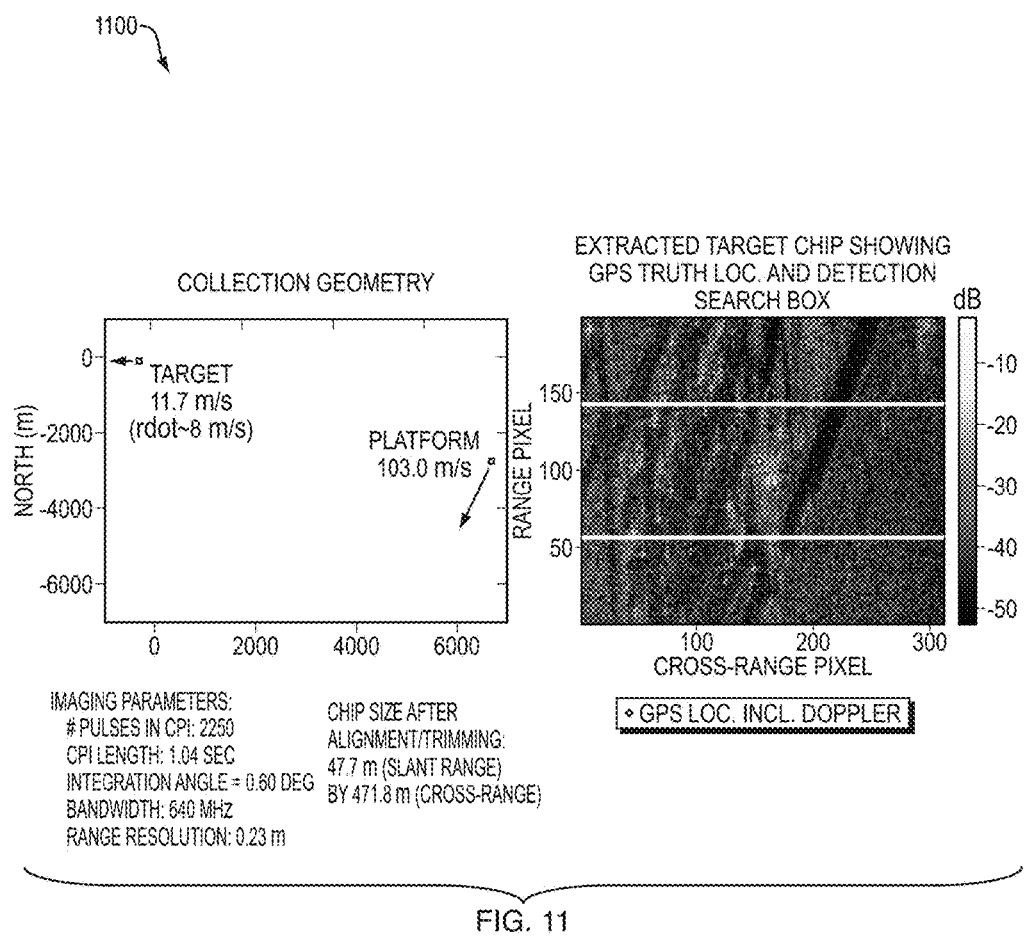
FIG. 11 is an extracted SAR image chip and imaging geometry for a more challenging vehicle CPI configured in accordance with one embodiment of the invention.

FIG. 10 shows a zoomed portion 1000 of the single channel SAR image before and after MRP, using the estimated F parameter associated with the detection that was sent to the tracker in the above example. The improved focus and amplitude of the target response is observable, demonstrating the validity of embodiments' MRP model on actual measured data.

FIG. 11 through FIG. 14 show results 1100 through 1400 corresponding to FIG. 7 through FIG. 10 for a more challenging CPI containing the same vehicle.

Figure 12:
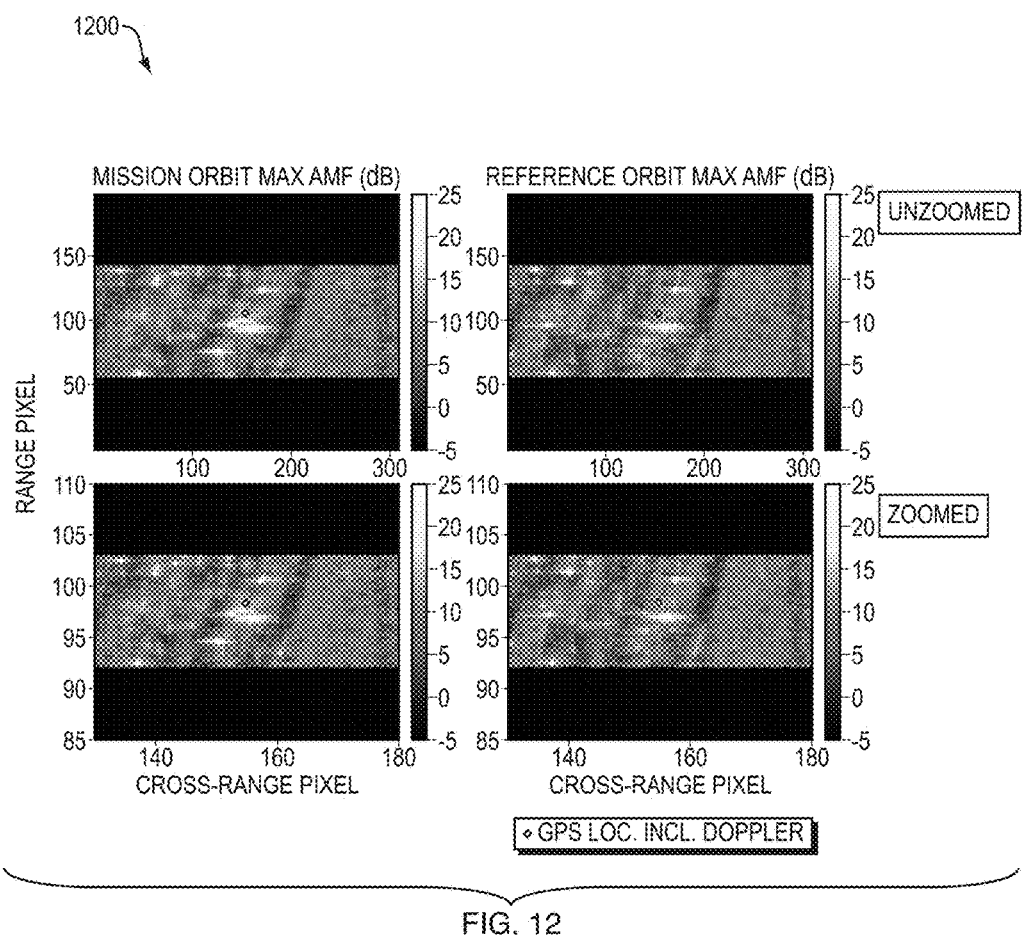
FIG. 12 is a STAP maximum AMF image for mission (left) and reference (right) passes configured in accordance with one embodiment of the invention.

FIG. 12 shows that the target response 1200 is close to some strong residual clutter that is appearing in both mission and reference orbits.

Figure 13:
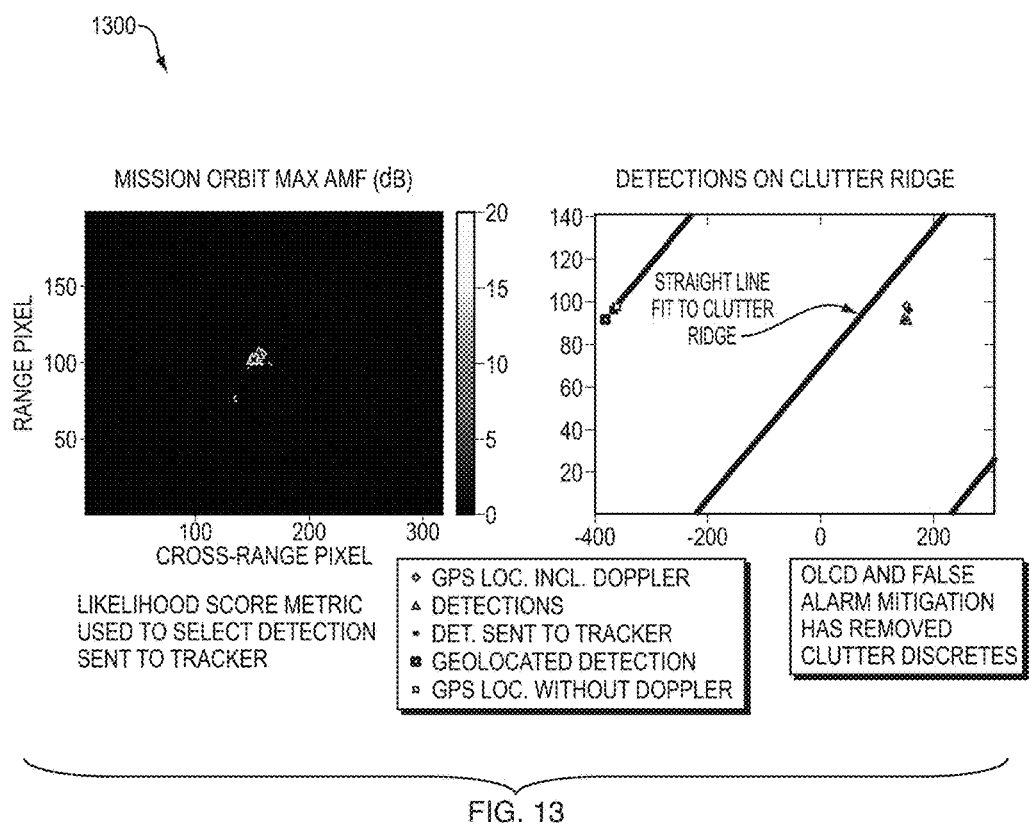
FIG. 13 is a STAP AMF image after OLCD and thresholding (15 dB AMF) and detections after 2D peaking configured in accordance with one embodiment of the invention.

FIG. 13 however shows 1300 that after the additional steps of thresholding, OLCD, 2D peaking, and space-time excision, only detections from the target of interest remain.

Figure 14:
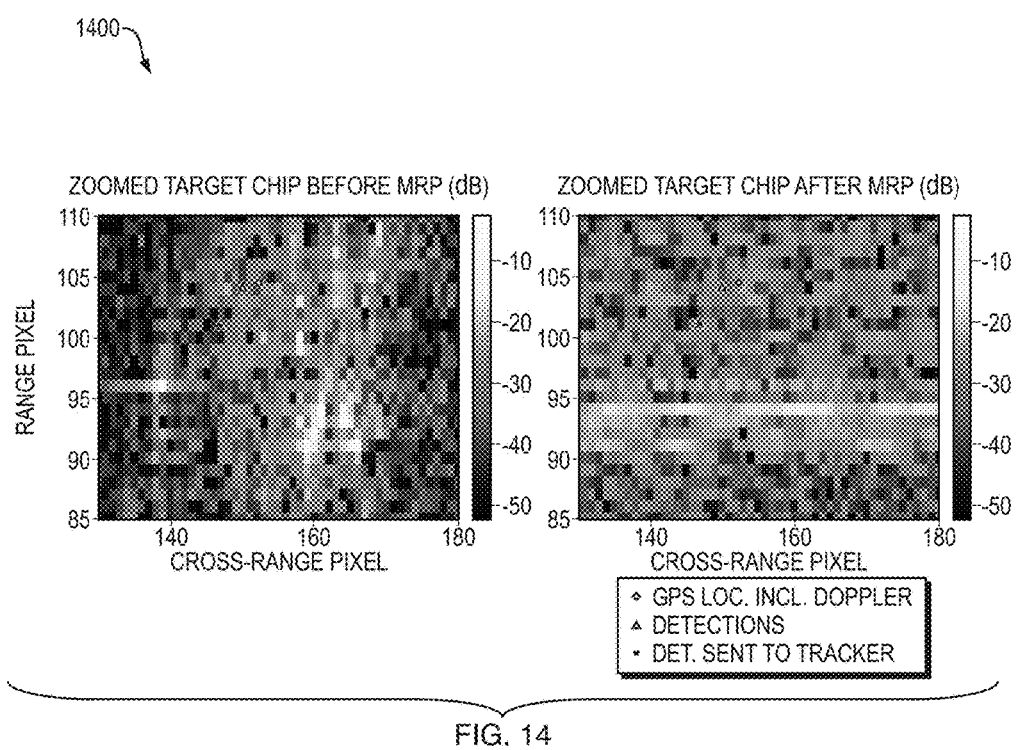
FIG. 14 is a zoomed portion of an image chip containing a target before and after MRP configured in accordance with one embodiment of the invention.

FIG. 14 shows that the target is not clearly visible in the single channel image 1400, in contrast to the prior example, demonstrating that STAP is definitely required to detect the target on this CPI.

While probably not normally applicable to dismounts, a conventional detection mode was added in order to be able to track vehicles through move-stop-move motions. Stopped vehicles on roads are often visible in SAR images. In the conventional mode, the false alarm rate tends to be higher. Consequently, AOA estimation is still performed and a likelihood metric still used to select detection sent to tracker in order to reduce the likelihood of updating with a false alarm. Additionally, non-coherent change detection (NCCD) is performed to further reduce false alarms. In order to automatically adapt as the target transitions between stopped and moving states, automation logic was developed to switch between conventional and STAP modes using the track state and report history.

The tracking performance embodiments have achieved on vehicles in the Gotcha 2006 Data Collection is now briefly summarized. Embodiments process a CPI every 0.1 second, and time-in-track for a given vehicle is defined starting from the initial "truth priming" of the tracker to one of the three following "failure" conditions:
  a) a dropped track;
  b) truth separated more than 15 m in range from center of chip; or
  c) truth outside chip in cross-range.

Using these conditions, embodiments have tracked a truthed Dodge Durango vehicle for 122.8 seconds. The Durango was moving through urban clutter, with the target often below clutter in the SAR image, and was undergoing move-stop-move maneuvers with multiple closely spaced targets present. It also experienced accelerations of up to 2 m/s$^2$, which resulted in very large amounts of defocus. A right turn during the track also stressed the ability of the geolocation and tracking to follow the actual target motion with limited sensor angle resolution. The Durango result was improved from 25 seconds in track using earlier NCCD-only processing on a single antenna channel. Embodiments also have tracked a Nissan Maxima vehicle for 131.7 seconds around three turns, through conditions that were not as stressing as for the Durango. Additionally, embodiments have tracked a street sweeper vehicle of opportunity for over 5 minutes, around several turns (only video truth was available for the street sweeper, but GPS truth was available for the other two targets).

Section 3: Application to Dismounts

While originally developed for vehicles, the GMTI processing described above has many potential benefits when applied to dismounts. Dismounts are more often buried in clutter, and STAP processing raises them above clutter. The improved detection/false alarm ratio produced by incorporating tracker feedback and the false alarm mitigation techniques defined in the processing translates into improved detection and tracking of dismounts compared to standard STAP. One important difference between vehicles and dismounts is the lower radar cross-section (RCS) for dismounts. As mentioned earlier, to compensate for the lowered RCS the mission orbit AMF detection threshold is decreased. To reduce the impact of this lowered threshold on false alarms, the maximum OLCD AMF threshold used on the reference pass is also decreased. Another difference between dismounts and vehicles is the maximum target velocity that is possible. Since dismounts cannot move as fast as vehicles, detections that lie beyond a certain Doppler distance from the clutter ridge can be filtered out. This in turn reduces the chances of mis-associating a dismount track with a vehicle detection.

Another difference between dismounts and vehicles is that dismounts are often off-road, while vehicles are usually moving on a road. Tracker embodiments employ BAE System's All-Source Track and Identity Fuser (ATIF) Multiple Hypothesis tracker (MHT), which uses a road network to improve track accuracy. This is a significant advantage for vehicles, but not for dismounts that are moving off-road. Finally, another significant difference relates to the MRP motion model embodiments employ. This model works very well for vehicles, which are often well described by the constant acceleration model. However, due to the complicated arm, trunk and leg motions of dismounts, the constant acceleration model is not expected to match the dismount response as well as for vehicles. A very accurate dismount model, however, would likely involve more parameters to search over. The effect of adding additional parameters on the selection of adaptive DOFs and overall detection to false alarm ratio (not to mention the increase in processing load) is a consideration. Results shown below however indicate that embodiments are able to track dismounts in the Gotcha 2006 Data Collection using embodiments' approach, and also suggest that the adaptive MRP processing is producing some benefit to dismount detection and tracking performance.

Figure 15:
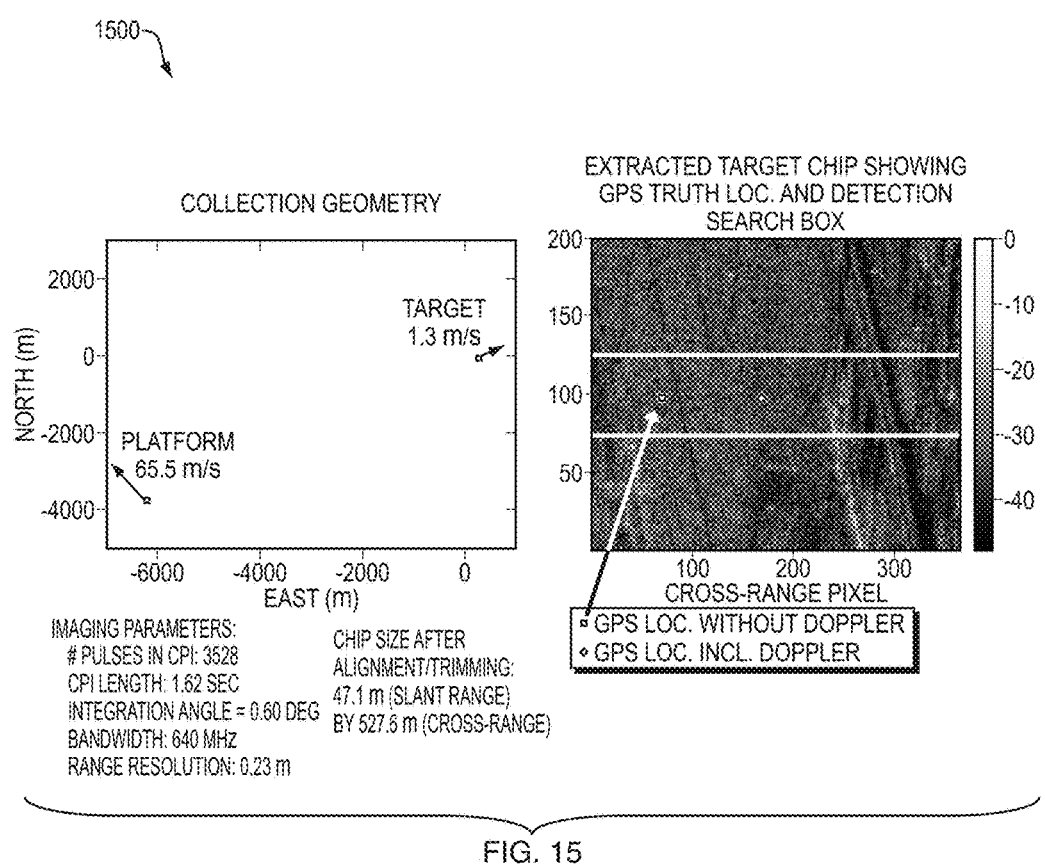
FIG. 15 is an extracted SAR image chip and imaging geometry for a typical CPI configured in accordance with one embodiment of the invention.

FIG. 15 shows the collection geometry and single-channel SAR chip 1500 for one of the CPIs from the Gotcha 2006 Data Collection that was processed containing a truthed dismount. This CPI was 2.5 seconds into a tracker-in-the-loop run that eventually produced a 54.6 second track.

Figure 16:
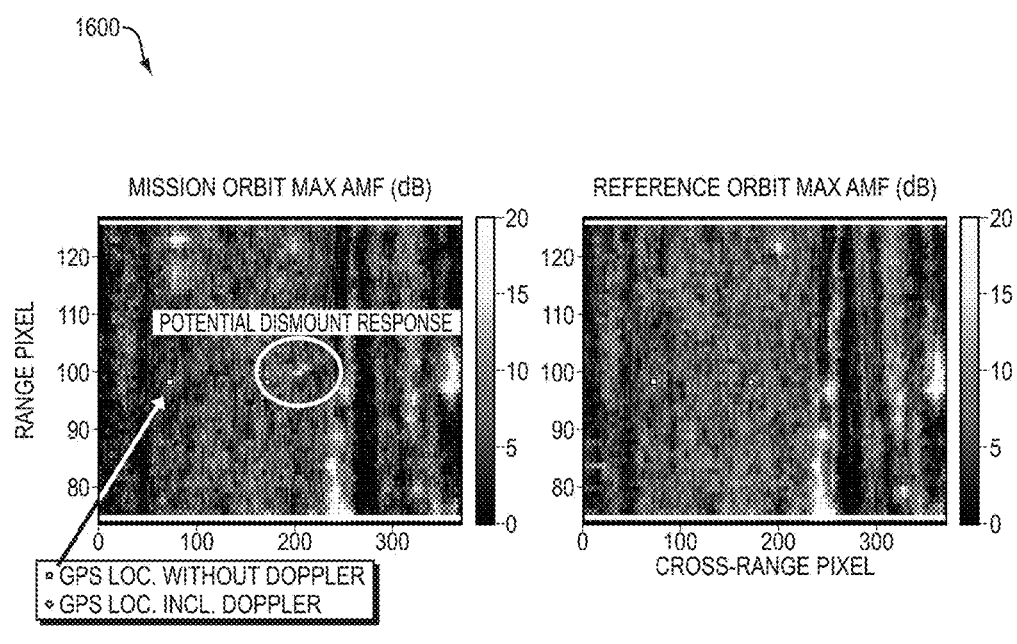
FIG. 16 is a STAP Maximum AMF image (zoomed) for mission and reference passes configured in accordance with one embodiment of the invention.

FIG. 16 shows the mission and reference orbit maximum AMF images 1600 on this CPI. A bright spot is seen close to the GPS truth in the mission AMF image, but not in the reference AMF image. The clutter environment has similar characteristics to that seen with vehicle CPIs in the data set: strong, spiky nonhomogeneous clutter returns. While some of this clutter is not suppressed in the mission AMF (due to covariance estimation errors), the same clutter will appear in the reference orbit AMF. The OLCD step employed thus removes most of the false alarms due to undernulled clutter. Clutter false alarms that do remain after OLCD can be further reduced using the space-time excision step that was described in Section 2.

Figure 17:
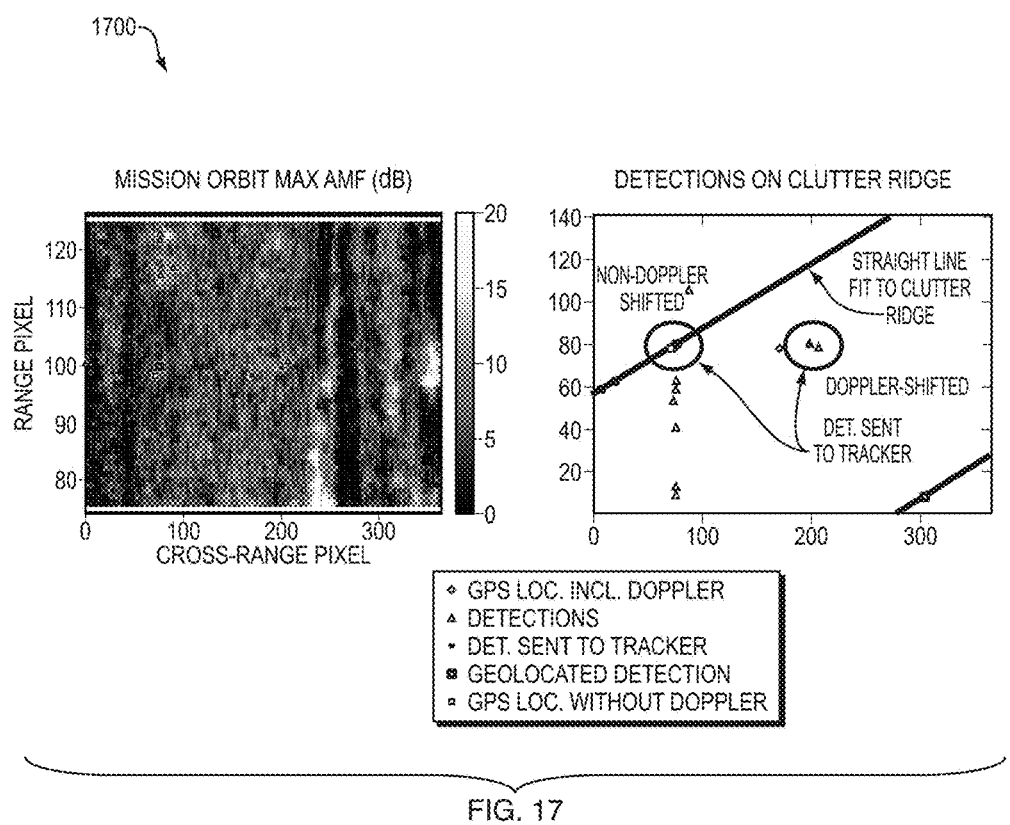
FIG. 17 shows STAP AMF and thresholded detections after 2D peak extraction and false alarm mitigation configured in accordance with one embodiment of the invention.

FIG. 17 shows the detections remaining 1700 after thresholding, OLCD, 2D peaking, and space-time excision on the mission AMF image and also on the measured clutter ridge (AOA index vs. cross-range) plot. While a significant number of detections are seen to remain, more false alarms are generally expected due to the lower detection threshold embodiments employed for dismounts. The detection sent to the tracker is seen to be located close to the GPS truth in both (Doppler-shifted) SAR coordinates (left half of FIG. 17), and in AOA index (right half of FIG. 17). The likelihood metric in Eq. (10) that embodiments employ to select the detection sent to the tracker incorporates how well the detection correlates in these measured quantities to the current track prediction, and was able to select the correct detection in this example.

Figure 18:
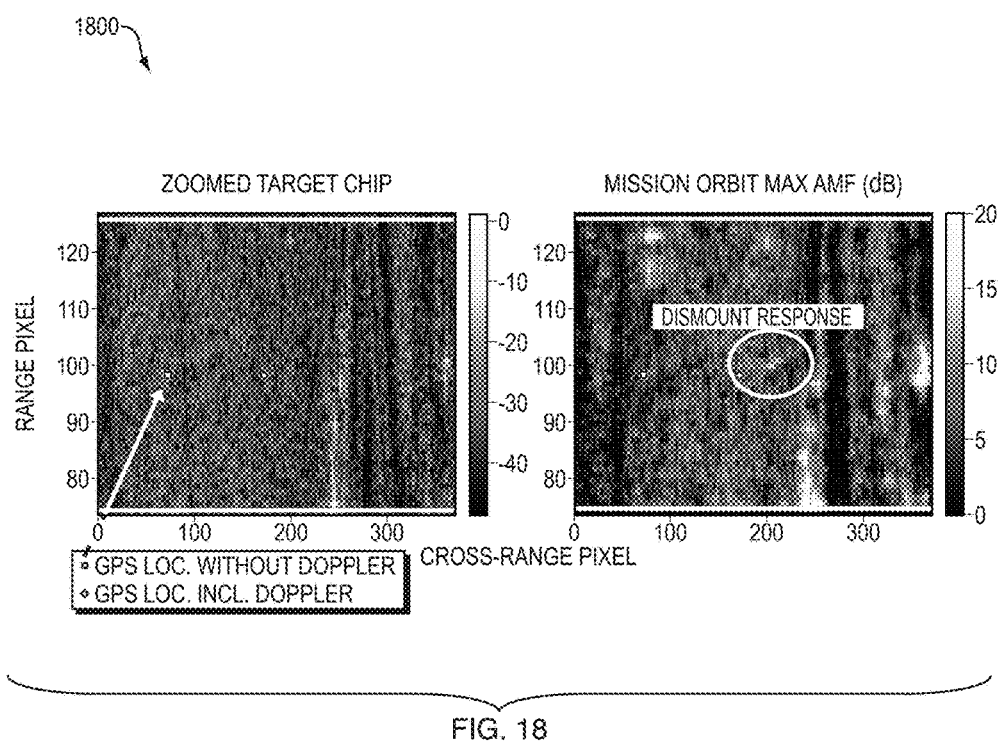
FIG. 18 is a zoomed target chip and mission pass STAP Maximum AMF image configured in accordance with one embodiment of the invention.
Figure 19:
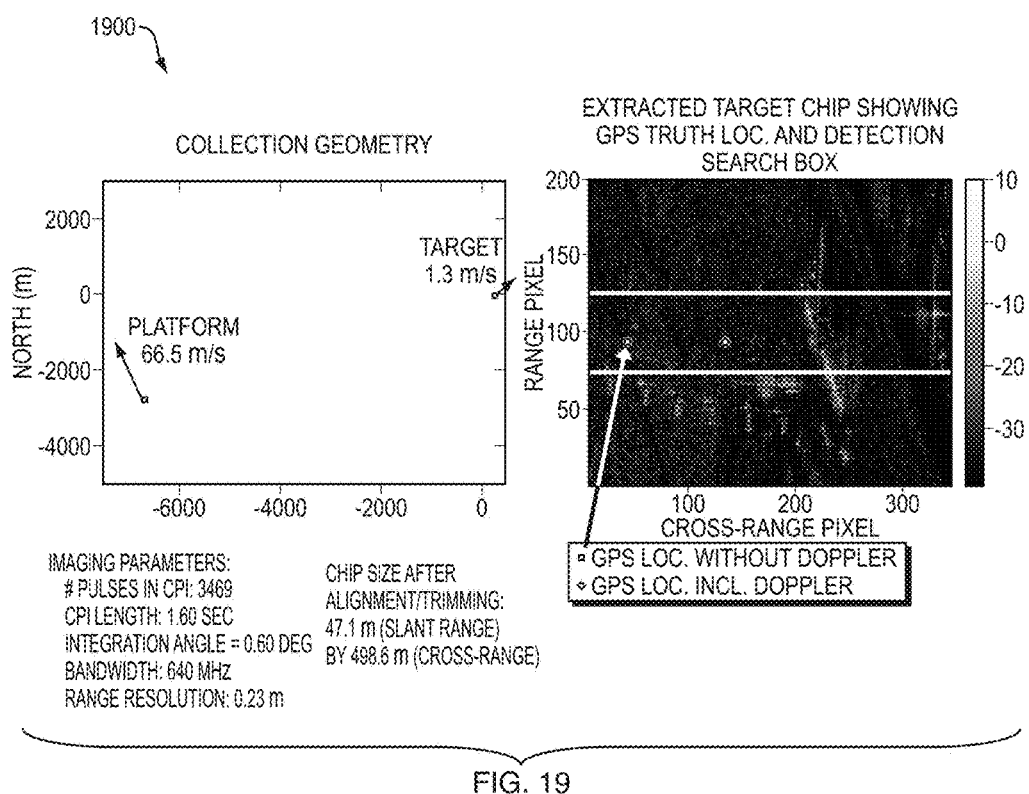
FIG. 19 is an extracted SAR chip and imaging geometry, 18.7 seconds into a scenario, configured in accordance with one embodiment of the invention.
Figure 20:
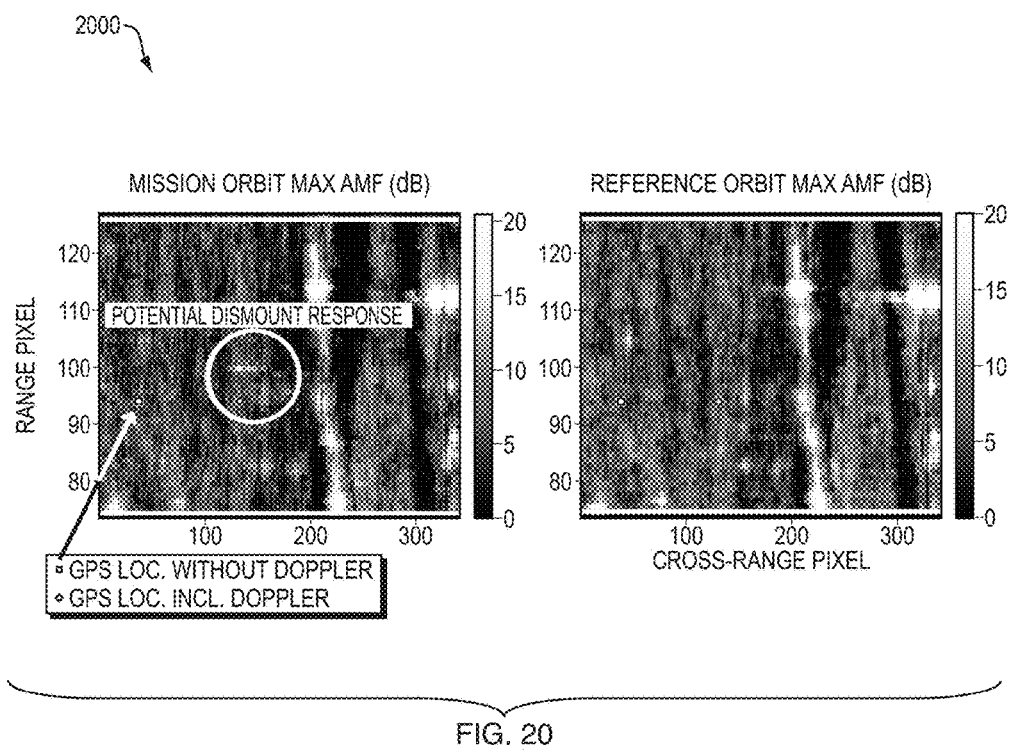
FIG. 20 is a STAP maximum AMF image (zoomed) for mission and reference passes configured in accordance with one embodiment of the invention.
Figure 21:
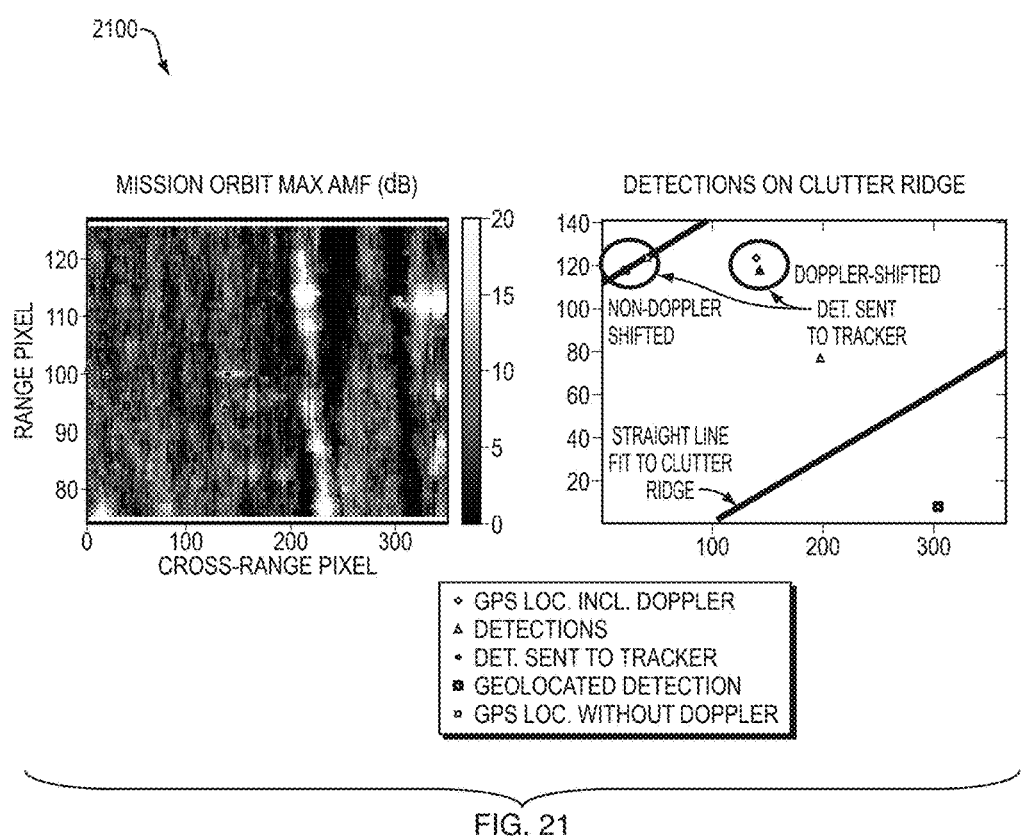
FIG. 21 is an image showing STAP AMF and thresholded detections after 2D peak extraction and false alarm mitigation configured in accordance with one embodiment of the invention.
Figure 22:
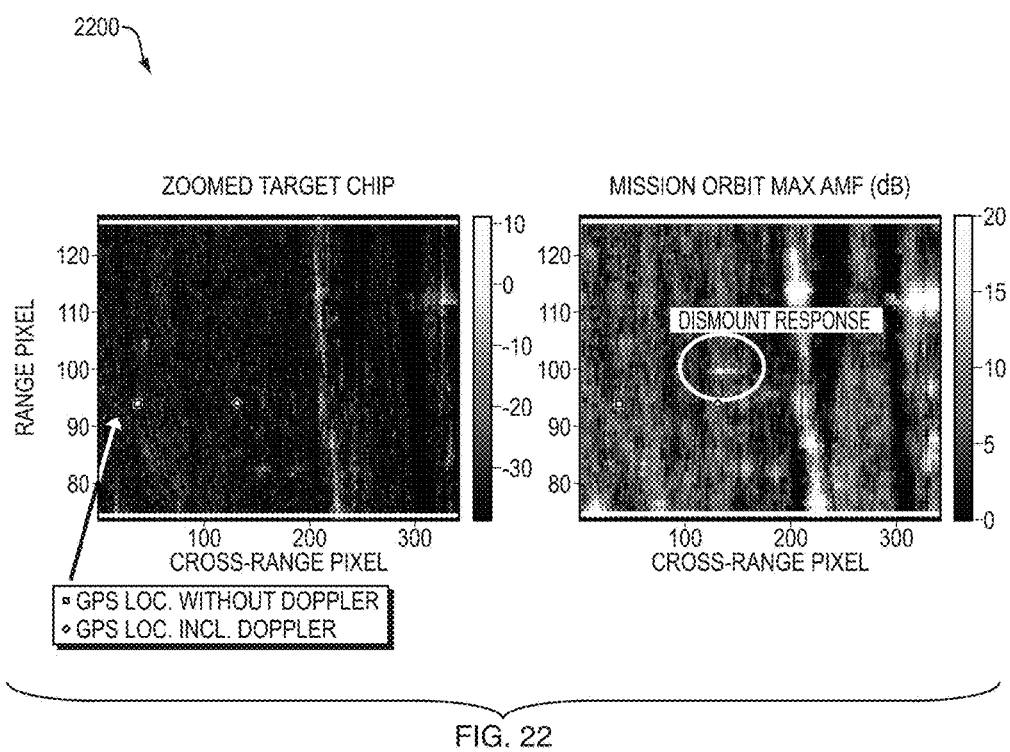
FIG. 22 is a zoomed target chip and mission pass STAP maximum AMF image configured in accordance with one embodiment of the invention.

FIG. 18 shows a zoomed portion 1800 of the single-channel SAR chip around the GPS truth, compared to the corresponding zoomed mission orbit maximum AMF portion. The dismount is clearly not visible in the single-channel SAR image, demonstrating that, for embodiments, STAP is required for this target.

FIG. 19 through FIG. 22 show the results 1900 through 2200 of processing another CPI, 18.7 seconds into the run. The conclusions are qualitatively the same as for the previous example. The dismount is not visible in the single-channel SAR chip, but is clearly detected using the STAP/MRP approach. Note that while there are fewer detections compared to the previous example after thresholding, OLCD, 2D peaking, and space-time excision, there are still two separated detections to choose from. The detection sent to the tracker (as determined by maximizing the likelihood metric in Eq. (10)) correlates well with the GPS truth in the both SAR coordinates and AOA.

Figure 23:
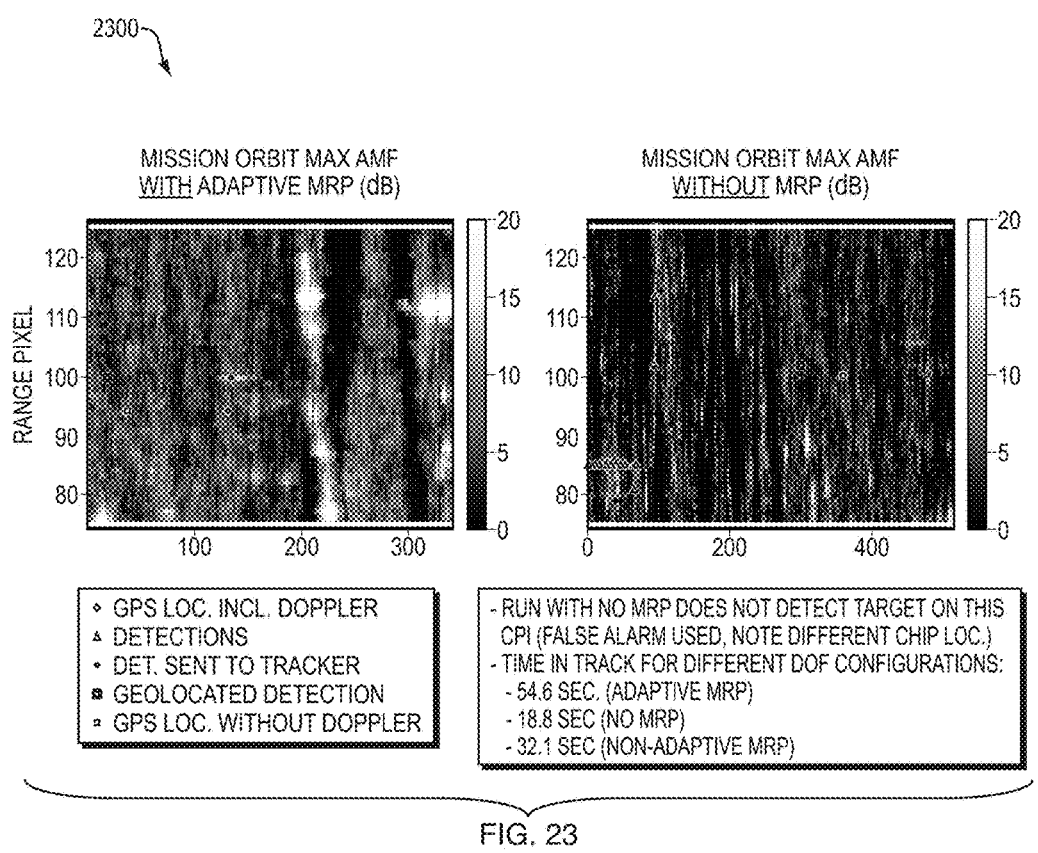
FIG. 23 is a maximum STAP AMF image and detections on two runs (with adaptive MRP) configured in accordance with one embodiment of the invention.

FIG. 23 depicts maximum STAP AMF image and detections 2300. It addresses the question of whether MRP is providing any benefits on dismounts. It compares the mission AMF images and resulting detections for the CPI example shown in FIG. 19 through FIG. 22 on two different tracker-in-the-loop runs:
a) using the adaptive MRP approach described above (left half of FIG. 23) and
b) without any MRP (right half of FIG. 23, spatial DOFs only).

Note that for the run without MRP, there are no detections close to the Doppler-shifted GPS truth location in the AMF image. Additionally, track errors have occurred, resulting in a chip that is significantly off-center compared to the GPS truth location (note that since the track states were different on these two runs, the extracted chips had different center locations and sizes). Also given in FIG. 23 are the times-in-track for three different STAP/MRP configurations. The best performance (54.6 seconds in track) was obtained using the adaptive MRP approach described. This result was significantly better than STAP with non-adaptive MRP (32.1 seconds in track) or STAP without any MRP (18.8 seconds).

Figure 24:
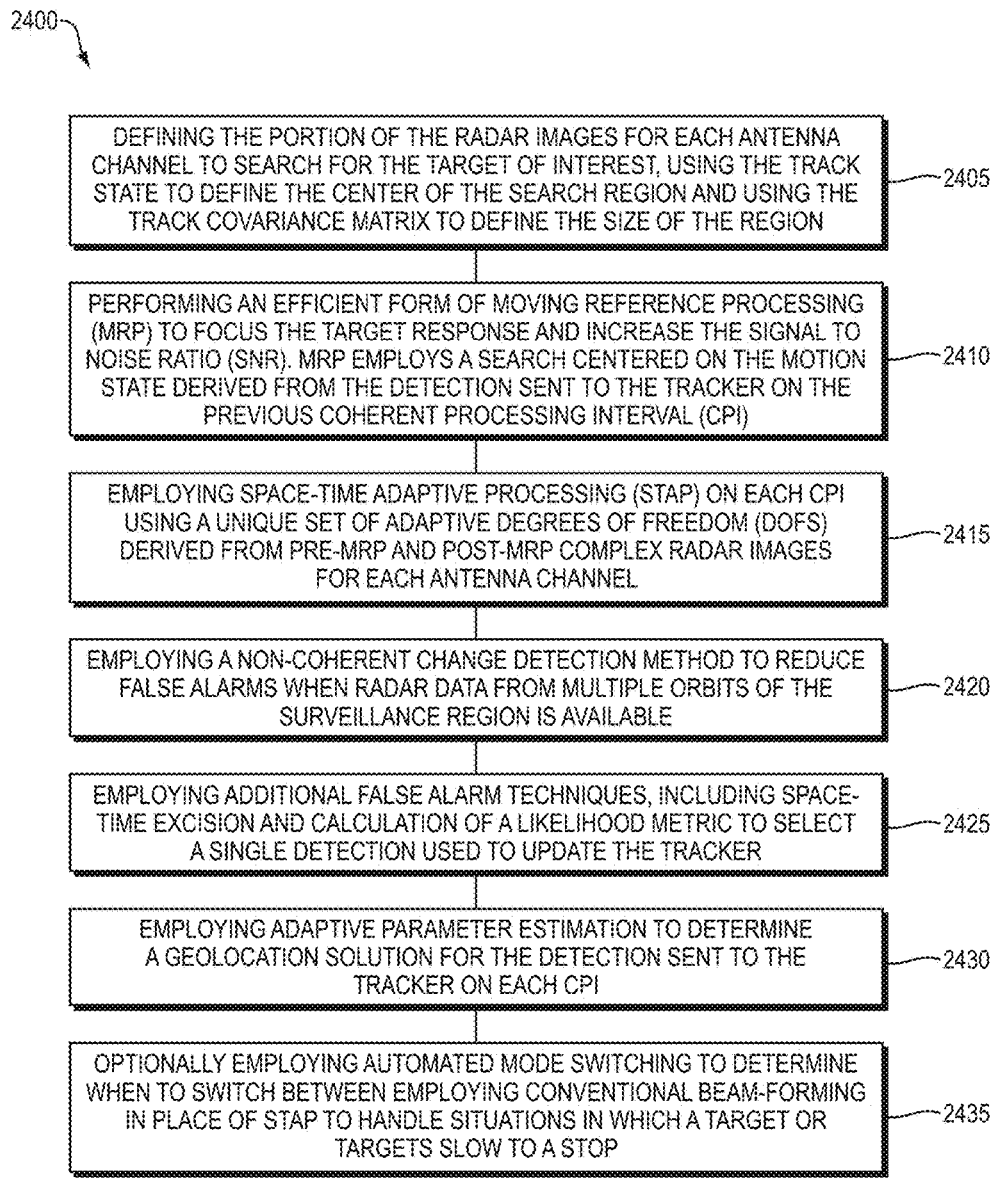
FIG. 24 is a method overview flow chart configured in accordance with one embodiment of the invention.

FIG. 24 is a method overview flow chart 2400. Steps comprise defining the portion of the radar images for each antenna channel to search for the target of interest, using the track state to define the center of the search region and using the track covariance matrix to define the size of the region 2405; performing an efficient form of moving reference processing (MRP) to focus the target response and increase the signal to noise ratio (SNR), MRP employs a search centered on the motion state derived from the detection sent to the tracker on the previous coherent processing interval (CPI) 2410; employing space-time adaptive processing (STAP) on each CPI using a unique set of adaptive degrees of freedom (DOFs) derived from pre-MRP and post-MRP complex radar images for each antenna channel 2415; employing a non-coherent change detection method to reduce false alarms when radar data from multiple orbits of the surveillance region is available 2420; employing additional false alarm techniques, including space-time excision and calculation of a likelihood metric to select a single detection used to update the tracker 2425; employing adaptive parameter estimation to determine a geolocation solution for the detection sent to the tracker on each CPI 2430; and employing conventional beam-forming in place of STAP to handle situations in which a target or targets slow to a stop (and are therefore not detectable by STAP) 2435, embodiments may also employ automated mode switching to determine when to switch between STAP and conventional processing.

Those skilled in the art will appreciate that the invention provides a system and method for detecting and tracking a single moving target using a multi-channel Gotcha radar system. Although the approach was originally developed for vehicles, it has been modified and applied to dismounts in the Gotcha 2006 Data Collection. The approach exploits tracker-feedback to address challenges for detection, false alarm mitigation, geolocation and tracking in an urban surveillance environment. The system performs SAR pre-processing and uses MRP adaptively in a STAP framework to focus up moving targets and enhance signal to clutter ratios. A number of steps have been defined to extract detections, mitigate false alarms, and minimize the chances of mis-association.

The foregoing description of the embodiments of the invention has been presented for the purposes of illustration and description. It is not intended to be exhaustive or to limit the invention to the precise form disclosed. Many modifications and variations are possible in light of this disclosure, it is to be understood that other similar embodiments may be used or modifications or additions may be made to the described embodiment for performing the same function of the present invention without deviating therefrom. It is intended that the scope of the invention be limited not by this detailed description, or any single embodiment, but rather by the claims appended hereto.

What is claimed is:

1. A system for radar detection of endo-clutter targets using tracker feedback, comprising:
selecting an endo-clutter target to be tracked;
tracking said endo-clutter target using a synthetic aperture radar (SAR) having a plurality of antenna channels;
for each of a plurality of coherent processing intervals (CPIs):
employing polar-format SAR pre-processing in a processor of a radar receiver device of motion-compensated phase history data for each said antenna channel;
determining a location of a processed SAR image chip by converting track location and velocity into SAR image coordinates, wherein a size of said chip is proportional to a tracker error ellipse;
compensating for defocusing due to target motion using an efficient one-dimensional moving reference processing (MRP) search over a single target defocus parameter expressed as a known function of said endo-clutter target and platform location, velocity, and acceleration; and performing space-time adaptive processing (STAP) on said SAR image chip using adaptive spatial antenna and temporal MRP degrees of freedom.

2. The system of claim 1 further comprising:

performing space-time excision and calculation of a likelihood metric to select a single detection to be used to update said tracker; and performing a polar formatting procedure to define a mapping from wavelength and slow-time to k-space.

3. The system of claim 2 wherein said polar formatting procedure employed to define a mapping from wavelength and slow-time to k-space comprises a polar angle function and an optional wavenumber scale function.

4. The system of claim 3 wherein said polar angle used in said polar formatting procedure corresponds to an angle of a platform Line of Sight (LOS), projected into a slant plane, as seen at a radar aim-point.

5. The system of claim 3 wherein said polar angle function and said wavenumber scale function are prescribed functions of slow-time.

6. The system of claim 3 wherein said wavenumber scale function is used to form images on planes other than a slant plane.

7. The system of claim 1 further comprising employing SAR pre-processing of motion-compensated phase history data for each said antenna channel, wherein said motion-compensated phase history of a moving point scatterer is a function of a variable F, comprising a quadratic MRP defocus parameter, and is a function of locations, velocities, and accelerations of said endo-clutter target and radar platform.

8. The system of claim 7 wherein implementation of said MRP compensates for defocus by applying a phase function in k-space whereby applying said phase function to a phase history function removes a quadratic defocus term from a target phase.

9. The system of claim 1 wherein said coherent processing interval (CPI) is determined by expected target dynamics.

10. A method of radar detection of endo-clutter high-value targets using tracker feedback, comprising the steps of:

defining a portion of radar images for each of a plurality of antenna channels to search an endo-clutter target of interest;

for each of a plurality of coherent processing intervals (CPIs):

using a track state to define a center of a search region;

using a track covariance matrix to define a size of said search region;

performing an efficient form of moving reference processing (MRP), which employs a search centered on a motion state derived from a detection sent to a tracker on a previous CPI, to focus a target response and increase a signal to noise ratio (SNR);

employing space-time adaptive processing (STAP) on each CPI using a unique set of adaptive degrees of freedom (DOFs) derived from pre-MRP and post-MRP complex radar image amplitudes for each said antenna channel;

employing a non-coherent change detection method to reduce false alarms when radar data from multiple orbits of a surveillance region is available;

employing additional false alarm mitigation techniques; and employing adaptive parameter estimation to determine a geolocation solution for a detection sent to said tracker on each said CPI.

11. The method of claim 10 further comprising performing a 2D peaking operation, said 2D peaking operation requiring that a detection be a simultaneous peak over cross-range and MRP motion state, thereby significantly reducing effects of MRP sidelobes and thus reducing a number of pixels that need to be considered.

12. The method of claim 10 wherein correction for target contamination is performed using a two-pass procedure and a straight line fit to a measured phase shift index for false alarm mitigation and geolocation.

13. The method of claim 10 wherein a likelihood metric is calculated using a 4-dimensional track grid centered on a current mean track state.

14. The method of claim 10 further comprising a Multiple Hypothesis tracker (MHT) which uses a road network to improve track accuracy.

15. The method of claim 10 wherein non-coherent change detection (NCCD) is performed to further reduce false alarms.

16. The method of claim 10 further comprising automatically switching between conventional and STAP modes as a target transitions between stopped and moving states, using automation logic, a track state, and report history.

17. The method of claim 10 wherein normal S TAP-mode processing employs a radial velocity threshold of about 0.5 m/s.

18. A method for radar detection, geolocating and tracking moving endo-clutter targets in multi-channel synthetic aperture radar (SAR) data using tracker feedback, comprising the steps of:

receiving, at a radar receiver device, a set of radar pulses from each of a plurality of antenna channels, said pulses being motion compensated and polar-format processed into a radar image;

defining a portion of said radar image for each said antenna channel to search for a target of interest, wherein a track state is used to define a center of a search region, and a track covariance matrix is used to define a size of said search region;

performing an efficient form of moving reference processing (MRP) to focus a target response and increase a signal to noise ratio (SNR), wherein said MRP employs a search centered on a motion state derived from a detection sent to a tracker on a previous coherent processing interval (CPI);

employing space-time adaptive processing (STAP) on each said CPI using a unique set of adaptive degrees of freedom (DOFs) derived from pre-MRP and post-MRP complex radar image amplitudes for each said antenna channel;

employing a non-coherent change detection method to reduce false alarms when radar data from multiple orbits of a surveillance region is available;

employing additional false alarm techniques, said additional false alarm techniques comprising space-time excision and calculation of a likelihood metric to select a single detection used to update said tracker;

employing adaptive parameter estimation to determine a geolocation solution for a detection sent to said tracker on each said CPI;

employing automated mode switching to determine when to switch between employing conventional beam-forming in place of STAP to handle situations in which a target or targets slow to a stop; and for each said CPI, annotating a geo-located target position on a display, said display including a geo-referenced radar image, and/or other map image layers.

* * * * *